US012067661B2

(12) United States Patent
Saito et al.

(10) Patent No.: US 12,067,661 B2
(45) Date of Patent: Aug. 20, 2024

(54) GENERATING HUMAN MOTION SEQUENCES UTILIZING UNSUPERVISED LEARNING OF DISCRETIZED FEATURES VIA A NEURAL NETWORK ENCODER-DECODER

(71) Applicant: Adobe Inc., San Jose, CA (US)

(72) Inventors: Jun Saito, Seattle, WA (US); Nitin Saini, Tübingen (DE); Ruben Villegas, Ann Arbor, MI (US)

(73) Assignee: Adobe Inc., San Jose, CA (US)

( * ) Notice: Subject to any disclaimer, the term of this patent is extended or adjusted under 35 U.S.C. 154(b) by 306 days.

(21) Appl. No.: 17/651,330

(22) Filed: Feb. 16, 2022

(65) Prior Publication Data
US 2023/0260182 A1 Aug. 17, 2023

(51) Int. Cl.
| G06T 13/40 | (2011.01) |
| G06T 9/00 | (2006.01) |
| G06T 13/20 | (2011.01) |
| G06T 17/00 | (2006.01) |

(52) U.S. Cl.
CPC .............. *G06T 13/40* (2013.01); *G06T 9/001* (2013.01); *G06T 13/205* (2013.01); *G06T 17/00* (2013.01)

(58) Field of Classification Search
CPC ....... G06T 13/40; G06T 9/001; G06T 13/205; G06T 17/00
See application file for complete search history.

(56) References Cited

U.S. PATENT DOCUMENTS

2020/0184316 A1* 6/2020 Kavukcuoglu ..... H03M 7/3082
2021/0319629 A1* 10/2021 Huang .................... G06T 19/20

OTHER PUBLICATIONS

Okan Arikan and D A Forsyth. Interactive motion generation from examples. ACM Trans. Graph., 21(3):483-490, Jul. 2002.
(Continued)

*Primary Examiner* — King Y Poon
*Assistant Examiner* — Vincent Peren
(74) *Attorney, Agent, or Firm* — Keller Preece PLLC

(57) ABSTRACT

Methods, systems, and non-transitory computer readable storage media are disclosed for utilizing unsupervised learning of discrete human motions to generate digital human motion sequences. The disclosed system utilizes an encoder of a discretized motion model to extract a sequence of latent feature representations from a human motion sequence in an unlabeled digital scene. The disclosed system also determines sampling probabilities from the sequence of latent feature representations in connection with a codebook of discretized feature representations associated with human motions. The disclosed system converts the sequence of latent feature representations into a sequence of discretized feature representations by sampling from the codebook based on the sampling probabilities. Additionally, the disclosed system utilizes a decoder to reconstruct a human motion sequence from the sequence of discretized feature representations. The disclosed system also utilizes a reconstruction loss and a distribution loss to learn parameters of the discretized motion model.

20 Claims, 13 Drawing Sheets

(56) References Cited

OTHER PUBLICATIONS

Alexei Baevski, Yuhao Zhou, Abdelrahman Mohamed, and Michael Auli. wav2vec 2.0: A framework for self-supervised learning of speech representations. In Hugo Larochelle, Marc Aurelio Ranzato, Raia Hadsell, Maria-Florina Balcan, and Hsuan-Tien Lin, editors, Advances in Neural Information Processing Systems 33: Annual Conference on Neural Information Processing Systems 2020, NeurIPS 2020, Dec. 6-12, 2020, virtual, 2020.
Patrick Esser, Robin Rombach, and Bjorn Ommer. Taming transformers for high-resolution image synthesis. In Proceedings of the IEEE/CVF Conference on Computer Vision and Pattern Recognition, pp. 12873-12883, 2021.
Chuan Guo, Xinxin Zuo, Sen Wang, Shihao Zou, Qingyao Sun, Annan Deng, Minglun Gong, and Li Cheng. Action2motion: Conditioned generation of 3d human motions. MM 2020—Proceedings of the 28th ACM International Conference on Multimedia, pp. 2021-2029, Jul. 2020.
Mohamed Hassan, Duygu Ceylan, Ruben Villegas, Jun Saito, Jimei Yang, Yi Zhou, and Michael J. Black. Stochastic scene-aware motion prediction. In Proceedings of the IEEE/CVF International Conference on Computer Vision (ICCV), pp. 11374-11384, Oct. 2021.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Gustav Eje Henter, Simon Alexanderson, and Jonas Beskow. Moglow: Probabilistic and controllable motion synthesis using normalising flows. ACM Transactions on Graphics, 39:14, 5 2019.
Eric Jang, Shixiang Gu, and Ben Poole. Categorical reparameterization with Gumbel-Softmax. Nov. 2016.
Lucas Kovar, Michael Gleicher, and Frederic Pighin. Motion graphs. ACM Trans. Graph., 21(3):473-482, Jul. 2002.
Jehee Lee, Jinxiang Chai, Paul S A Reitsma, Jessica K Hodgins, and Nancy S Pollard. Interactive control of avatars animated with human motion data. ACM Trans. Graph., 21(3):491-500, Jul. 2002.
Sergey Levine, Jack M. Wang, Alexis Haraux, Zoran Popovic, and Vladlen Koltun. Continuous character control with low-dimensional embeddings. ACM Trans. Graph., 31(4), Jul. 2012.
Jiaman Li, Ruben Villegas, Duygu Ceylan, Jimei Yang, Zhengfei Kuang, Hao Li, and Yajie Zhao. Task-Generic hierarchical human motion prior using VAEs. Jun. 2021.
Bokman Lim, Syungkwon Ra, and F. C. Park. Movement primitives, principal component analysis, and the efficient generation of natural motions. Proceedings—IEEE International Conference on Robotics and Automation, 2005:4630-4635, 2005.
Hung Yu Ling, Fabio Zinno, George Cheng, and Michiel Van De Panne. Character controllers using motion VAEs. ACM Trans. Graph., 39(4):40:1-40:12, Jul. 2020.
Matthew Loper, Naureen Mahmood, Javier Romero, Gerard Pons-Moll, and Michael J. Black. SMPL: A skinned multi-person linear model. ACM Trans. Graphics (Proc. SIGGRAPH Asia), 34(6):248:1-248:16, Oct. 2015.
Naureen Mahmood, Nima Ghorbani, Nikolaus F Troje, Gerard Pons-Moll, and Michael J Black. AMASS: Archive of motion capture as surface shapes. In Proceedings of the IEEE/CVF International Conference on Computer Vision, pp. 5442-5451, 2019.
Jianyuan Min and Jinxiang Chai. Motion graphs++: a compact generative model for semantic motion analysis and syn-thesis. ACM Trans. Graph., 31(6):1-12, Nov. 2012.

Dirk Ormoneit, Michael J. Black, Trevor Hastie, and Hedvig Kjellstrom. Representing cyclic human motion using functional analysis. Image and Vision Computing, 23:1264-1276, 12 2005.
Mathis Petrovich, Michael J. Black, and Gul Varol. Action-conditioned 3D human motion synthesis with transformer VAE. In International Conference on Computer Vision (ICCV), 2021.
Abhinanda R Punnakkal, Arjun Chandrasekaran, Nikos Athanasiou, Alejandra Quiros-Ramirez, and Michael J Black. Babel: Bodies, action and behavior with english labels.
Aditya Ramesh, Mikhail Pavlov, Gabriel Goh, Scott Gray, Chelsea Voss, Alec Radford, Mark Chen, and Ilya Sutskever. Zero-shot text-to-image generation. In Marina Meila and Tong Zhang, editors, Proceedings of the 38th International Conference on Machine Learning, vol. 139 of Proceedings of Machine Learning Research, pp. 8821-8831. PMLR, Jul. 18-24, 2021.
Ali Razavi, Aaron van den Oord, and Oriol Vinyals. Generating diverse high-fidelity images with vq-vae-2. In H. Wallach, H. Larochelle, A. Beygelzimer, F. d'Alché-Buc, E. Fox, and R. Garnett, editors, Advances in Neural Information Processing Systems, vol. 32. Curran Associates, Inc., 2019.
Davis Rempe, Tolga Birdal, Aaron Hertzmann, Jimei Yang, Srinath Sridhar, and Leonidas J. Guibas. Humor: 3d human motion model for robust pose estimation. In International Conference on Computer Vision (ICCV), 2021.
Alexander Richard, Michael Zollhoefer, Yandong Wen, Fernando de la Torre, and Yaser Sheikh. Meshtalk: 3d face animation from speech using cross-modality disentanglement. Apr. 2021.
Alla Safonova and Jessica K Hodgins. Construction and optimal search of interpolated motion graphs. In ACM SIGGRAPH 2007 papers, SIGGRAPH '07, pp. 106-es, New York, NY, USA, Jul. 2007. Association for Computing Machinery.
Alla Safonova, Jessica K Hodgins, and Nancy S Pollard. Synthesizing physically realistic human motion in low-dimensional, behavior-specific spaces. ACM Trans. Graph., 23(3):514-521, Aug. 2004.
Sebastian Starke, He Zhang, Taku Komura, and Jun Saito. Neural state machine for character-scene interactions. ACM 722 Trans. Graph., 38(6):1-14, Nov. 2019.
Sebastian Starke, Yiwei Zhao, Taku Komura, and Kazi Zaman. Local motion phases for learning multi-contact character movements. ACM Trans. Graph., 39(4):54:1-54:13, Jul. 2020.
Sebastian Starke, Yiwei Zhao, Fabio Zinno, and Taku Komura. Neural animation layering for synthesizing martial arts movements. ACM Trans. Graph., 40(4):1-16, Jul. 2021.
Raquel Urtasun, David J. Fleet, and Neil D. Lawrence. Modeling human locomotion with topologically constrained latent variable models. Lecture Notes in Computer Science (including subseries Lecture Notes in Artificial Intelligence and Lecture Notes in Bioinformatics), 4814 LNCS:104-118, 2007.
Aaron van den Oord, Oriol Vinyals, and Koray Kavukcuoglu. Neural discrete representation learning. Nov. 2017.
Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in neural information processing systems, pp. 5998-6008, 2017.
Jack M Wang, David J Fleet, and Aaron Hertzmann. Gaussian process dynamical models for human motion.IEEE Trans. Pattern Anal. Mach. Intell., 30(2):283-298, Feb. 2008.
He Zhang, Sebastian Starke, Taku Komura, and Jun Saito. Mode-adaptive neural networks for quadruped motion control. ACM Trans. Graph., 37(4), Jul. 2018.
Yi Zhou, Connelly Barnes, Jingwan Lu, Adobe Research, Jimei Yang, and Hao Li. On the continuity of rotation representations in neural networks. Jun. 8, 2020.

\* cited by examiner

GENERATING HUMAN MOTION SEQUENCES UTILIZING UNSUPERVISED LEARNING OF DISCRETIZED FEATURES VIA A NEURAL NETWORK ENCODER-DECODER

BACKGROUND

Recent years have seen significant advancements in hardware and software platforms used for processing digital content. Many industries utilize digital images and digital image sequences of a scene including one or more three-dimensional objects for use in a variety of different applications, such as digital movies, video games, digital advertising, and graphic design. For example, some industries provide tools for users to computer-assisted generation of three-dimensional scenes and animations including human or humanoid models. Additionally, the proliferation of machine-learning has improved the speed and usefulness of computer-assisted content generation in a number of industries. Accurately representing human motions with significant variability in body types and motion states, however, is a challenging task. Conventional image generation systems suffer from a number of shortcomings with regard to efficiently, flexibly, and accurately generating and reconstructing human motion sequences.

SUMMARY

This disclosure describes one or more embodiments of methods, non-transitory computer readable media, and systems that solve the foregoing problems (in addition to providing other benefits) by utilizing unsupervised learning of discrete human motions to generate digital human motion sequences. The disclosed systems utilize an encoder of a discretized motion model to extract a sequence of latent feature representations from a human motion sequence in an unlabeled digital scene (e.g., a sequence of three-dimensional models). The disclosed systems also determine sampling probabilities from the sequence of latent feature representations in connection with a codebook of discretized feature representations associated with human motions. The disclosed systems convert the sequence of latent feature representations into a sequence of discretized feature representations by sampling from the codebook based on the sampling probabilities. Additionally, the disclosed systems utilize a decoder to reconstruct a human motion sequence from the sequence of discretized feature representations. In one or more embodiments, the disclosed systems also utilize a reconstruction loss and a distribution loss to learn parameters of the discretized motion model. The disclosed systems thus utilize an unsupervised encoder-decoder architecture to learn discrete human motions for generating human motion sequences.

BRIEF DESCRIPTION OF THE DRAWINGS

Various embodiments will be described and explained with additional specificity and detail through the use of the accompanying drawings in which.

DETAILED DESCRIPTION

Figure 1:
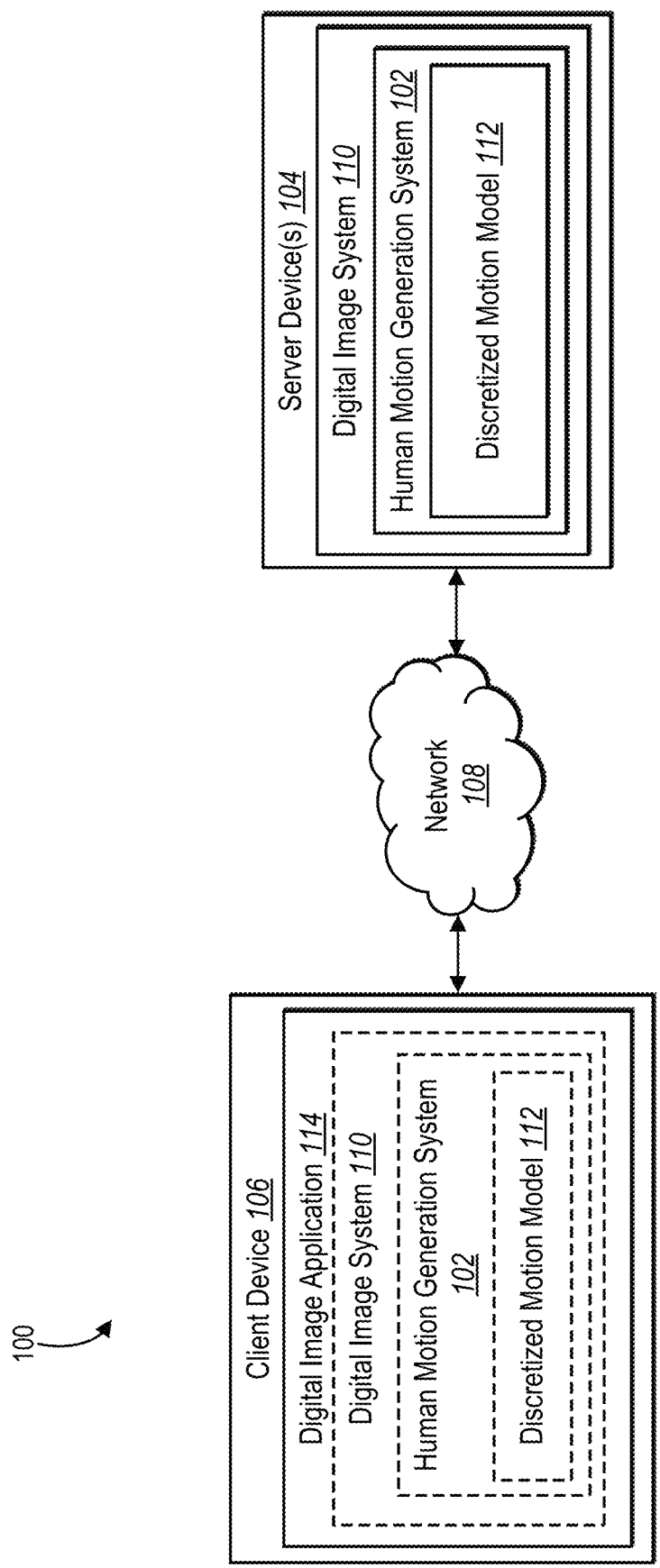
FIG. 1 illustrates an example system environment in which a human motion generation system can operate in accordance with one or more implementations.

This disclosure describes one or more embodiments of a human motion generation system that utilizes unsupervised learning of discrete human motions for generating human motion sequences. In one or more embodiments, the human motion generation system utilizes an encoder of a discretized motion model to extract latent features from a sequence of human motions in an unlabeled digital scene. Additionally, the human motion generation system utilizes a codebook of the discretized motion model including learned latent feature representations corresponding to human motions for mapping a sequence of encoded latent feature representations to a sequence of discretized feature representations. The human motion generation system also utilizes a decoder to generate a reconstructed human motion sequence based on the sequence of discretized feature representations. In additional embodiments, the human motion generation system utilizes a plurality of losses based on the reconstructed human motion sequence and intermediate representations of the input sequence of human motions to train the discretized motion model.

As previously mentioned, in one or more embodiments, the human motion generation system utilizes a discretized motion model to extract latent features from a sequence of human motions in a digital scene (e.g., a three-dimensional scene). For example, the human motion generation system utilizes a discretized motion model that includes an encoder to generate latent feature representations of a human motion sequence in a digital scene of sequential three-dimensional movements. To illustrate, the human motion generation system utilizes a neural network encoder including convolutional layers or transformer layers to generate a sequence of latent feature representations in a continuous latent space based on the digital scene.

In some embodiments, the human motion generation system also utilizes the discretized motion model to convert the latent feature representations generated by an encoder into a sequence of discretized feature representations. Specifically, the human motion generation system utilizes a distribution discretization layer of the discretized motion model to determine a plurality of sampling probabilities based on the sequence of latent feature representations. For instance, the discretized motion model includes a Gumbel-softmax layer that converts the latent feature representations into sets of sampling probabilities in connection with a plurality of learned latent feature representations in a codebook of the discretized motion model.

In additional embodiments, the human motion generation system converts the latent feature representations into discretized feature representations based on the sets of sampling probabilities. In particular, the human motion generation system determines the discretized feature representations from a codebook of learned latent feature representations corresponding to discrete human motions. To illustrate, the human motion generation system samples the discretized feature representations from the codebook according to the sampling probabilities corresponding to the sequence of latent feature representations generated by the encoder.

In one or more embodiments, the human motion generation system utilizes the discretized motion model to generate a reconstructed human motion sequence from the discretized feature representations. Specifically, the discretized motion model includes a decoder to convert the discretized feature representations into a human motion sequence (e.g., a plurality of three-dimensional models representing a set of human motions). In some embodiments, the human motion generation system also generates one or more transitions between two or more human motion sequences based on the discrete human motions corresponding to the discretized feature representations.

In one or more additional embodiments, the human motion generation system utilizes one or more losses to train the discretized motion model. For instance, the human motion generation system determines a reconstruction loss based on differences between the reconstructed human motion sequence and the original human motion sequence in the digital scene. The human motion generation system also determines a distribution loss (e.g., a KL divergence loss) based on the sampling probabilities corresponding to the latent feature representations from the encoder. The human motion generation system utilizes a combined loss including the reconstruction loss and the distribution loss to learn parameters of the encoder, decoder, distribution discretization layer, and/or the codebook.

As mentioned, conventional image generation systems have a number of shortcomings in relation to efficiency, flexibility, and accuracy of operation. For example, some conventional image generation systems utilize motion graphs including discrete motion segments from captured data labeled as nodes and transitions as edges. While these conventional systems provide intuitive and practical utility for character animation in various industries once the motion graphs are constructed, the conventional systems lack scalability. Specifically, the conventional systems require manual labeling of motion segments and transition parameters, which requires significant time and expertise. Accordingly, the conventional systems lack efficiency, because they are limited to only specific motions segments (and corresponding transitions) that have previously been labeled without significant additional time and effort.

Furthermore, some conventional image generation systems attempt to limit human involvement by using learning-based approaches involving Gaussian processes, component analysis, and neural network based approaches. While such conventional systems utilize available data to reduce the amount of time and expertise for determining motion sequences, these systems lack flexibility and scalability over different types of motions. Specifically, some of the conventional systems that utilize such learning-based methods lack expressiveness in motion ranges. Accordingly, some conventional systems suffer from bias to common motions, such as walking due to oversimplified latent feature distributions.

Conventional systems that leverage neural network approaches also lack scalability and flexibility for large motion datasets with a variety of different motion types. In particular, while these conventional systems are able to learn motions in multi-modal motion spaces, they assume a single simplified distribution (e.g., Gaussian) on the motion prior. Accordingly, when dealing with large, varied datasets, the conventional systems improve expressiveness in motions at the expensive of accuracy with respect to certain motions (e.g., walking motions), as indicated above. Thus, the conventional systems lack flexibility of application to datasets with large variations in human motions.

The disclosed human motion generation system provides a number of advantages over conventional systems. For example, the human motion generation system improves the efficiency of computing devices that implement digital image generation and reconstruction. Specifically, in contrast to conventional systems that rely on datasets of manually labeled motion data and transition parameters, the human motion generation system utilizes unsupervised learning of human motion priors with discretized latent representations from unlabeled data. For example, by leveraging a neural network encoder-decoder architecture with a codebook of learned, discretized feature representations corresponding to human motions, the human motion generation system automatically and efficiently reconstructs or generates human motion sequences without human intervention. Thus, the human motion generation system provides the ability to quickly and easily reconstruct human motion sequences in applications, such as digital game development and digital video generation.

In addition, the human motion generation system improves the flexibility of computing devices implementing digital image generation and reconstruction. In particular, by learning human motion priors with discretized latent feature representations, the human motion generation system also provides improved accuracy for generating or reconstructing human motion sequences from datasets of varied sizes and/or motion types. More specifically, by utilizing a combination of reconstruction losses and distribution losses in connection with a reconstructed human motion sequence, the human motion generation system provides unsupervised learning of a latent space for encoding and discretizing human motions. Accordingly, the human motion generation system is adaptable to different datasets with a variety of simple and complex human motions.

In connection with improving the efficiency and flexibility of computing devices that generate or reconstruct human motion sequences, the human motion generation system also provides improved accuracy. For example, by utilizing a combination of losses to update parameters an encoder, decoder, codebook, and distribution layers of a discretized motion model for discretizing human motions, the human motion generation system provides more accurate representations of human motions without human intervention over conventional systems. Specifically, the human motion generation system provides accurate clustering of different categories of human motion in a discrete latent space, which further lends to more accurate discretization and generation of human motion sequences in a variety of applications including motion transition generation between different motion categories.

Turning now to the figures, FIG. 1 includes an embodiment of a system environment 100 in which an human motion generation system 102 is implemented. In particular, the system environment 100 includes server device(s) 104 and a client device 106 in communication via a network 108. Moreover, as shown, the server device(s) 104 include a digital image system 110, which includes the human motion generation system 102. As further illustrate in FIG. 1, the human motion generation system 102 includes a discretized motion model 112. Additionally, the client device 106 includes a digital image application 114, which optionally includes the digital image system 110 and the human motion generation system 102, which further includes the discretized motion model 112.

As shown in FIG. 1, in one or more implementations, the server device(s) 104 includes or hosts the digital image system 110. Specifically, the digital image system 110 includes, or is part of, one or more systems that implement digital image processing. For example, the digital image system 110 provides tools for viewing, generating, editing, and/or otherwise interacting with digital images (e.g., digital images, digital video frames, three-dimensional models). To illustrate, the digital image system 110 communicates with the client device 106 via the network 108 to provide the tools for display and interaction via the digital image application 114 at the client device 106. Additionally, in some embodiments, the digital image system 110 receives data from the client device 106 in connection with editing digital images, including requests to access digital images stored at the server device(s) 104 (or at another device such as a source repository) and/or requests to store digital images from the client device 106 at the server device(s) 104 (or at another device). In some embodiments, the digital image system 110 receives interaction data for viewing, generating, or editing a digital image from the client device 106, processes the interaction data (e.g., to view, generate, or edit a digital image), and provides the results of the interaction data to the client device 106 for display via the digital image application 114 or to a third-party system.

In one or more embodiments, the digital image system 110 provides tools for modifying digital images. In particular, the digital image system 110 provides tools (e.g., via the digital image application 114) for selecting, deleting, or adding content within a digital image. Additionally, the digital image system 110 utilizes the human motion generation system 102 to intelligently reconstruct or generate a human motion sequence within a digital image (e.g., without requiring user construction/modification of digital representations of human motions). For example, the digital image system 110 utilizes the human motion generation system 102 to reconstruct a human motion sequence from a digital video (e.g., by creating a set of three-dimensional models). In additional examples, the digital image system 110 utilizes the human motion generation system 102 to generate a human motion sequence from a set of instructions (e.g., speech or text). In one or more embodiments, the human motion generation system 102 utilizes the discretized motion model 112 including an encoder-decoder architecture to generate/reconstruct a human motion sequence according to feature representations in a learned latent space.

In one or more embodiments, a neural network includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a deep learning model, a convolutional neural network, a transformer neural network, a recurrent neural network, a fully-connected neural network, or a combination of a plurality of neural networks and/or neural network types. In one or more embodiments, the discretized motion model 112 includes, but is not limited to, a plurality of neural network layers to encode feature representations of a human motion sequence, discretize the feature representations of the human motion sequence, and reconstruct the human motion sequence based on the discretized feature representations.

In one or more embodiments, after generating a human motion sequence utilizing the human motion generation system 102, the digital image system 110 provides the modified human motion sequence to the client device 106 for display. For instance, the digital image system 110 sends the human motion sequence (or data such as a sequence of three-dimensional models or poses representing the human motion sequence within a three-dimensional space) to the client device 106 via the network 108 for display via the digital image application 114. Additionally, the client device 106 can receive additional inputs to apply additional changes to the human motion sequence or to replace the human motion sequence with a different human motion sequence (e.g., based on a digital video including a different input human motion sequence). The digital image system 110 utilizes the human motion generation system 102 to further modify the human motion sequence or replace the human motion sequence with a new human motion sequence.

In one or more embodiments, the server device(s) 104 include a variety of computing devices, including those described below with reference to FIG. 10. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images). In some embodiments, the client device 106 also performs functions for generating, capturing, or accessing data to provide to the digital image system 110 and the human motion generation system 102 in connection with modifying digital images. For example, the client device 106 communicates with the server device(s) 104 via the network 108 to provide information (e.g., user interactions) associated with digital images. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the human motion generation system 102 being implemented by a particular component and/or device within the system environment 100, the human motion generation system 102 can be implemented, in whole or in part, by other computing devices and/or components in the system environment 100 (e.g., the client device 106).

In particular, in some implementations, the human motion generation system 102 on the server device(s) 104 supports the human motion generation system 102 on the client device 106. For instance, the human motion generation system 102 on the server device(s) 104 generates or trains the human motion generation system 102 (e.g., the discretized motion model 112) for the client device 106. The server device(s) 104 provides the trained human motion generation system 102 to the client device 106. In other words, the client device 106 obtains (e.g., downloads) the human motion generation system 102 from the server device(s) 104. At this point, the client device 106 is able to utilize the human motion generation system 102 to generate human motion sequences independently from the server device(s) 104.

In alternative embodiments, the human motion generation system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform human motion sequence generation operations, and, in response, the human motion generation system 102 or the digital image system 110 on the server device(s) 104 performs operations to generate and/or edit digital images. The server device(s) 104 provide the output or results of the operations to the client device 106.

Figure 2:
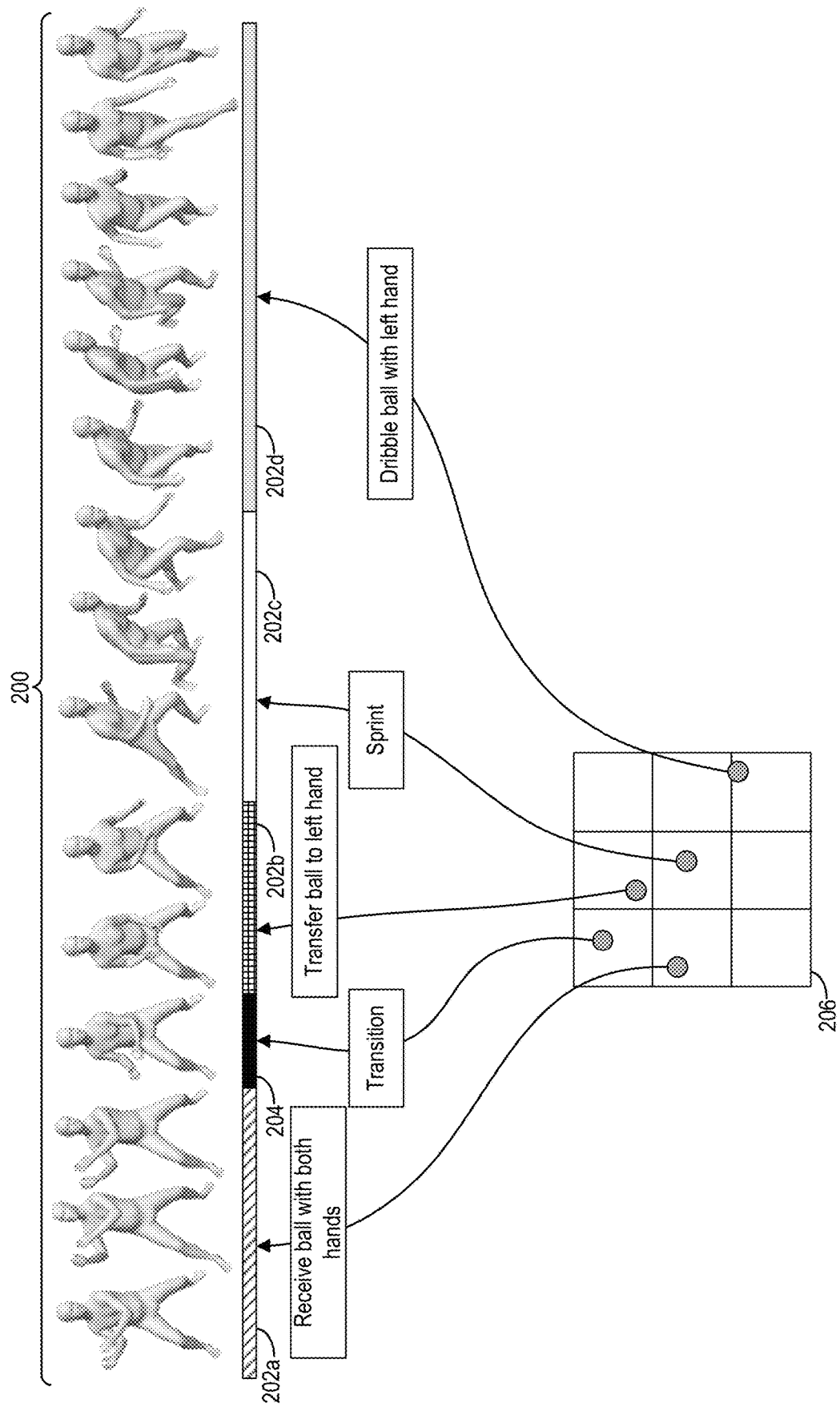
FIG. 2 illustrates a diagram of a sequence of human motions mapped to a latent space in accordance with one or more implementations.

As mentioned, the human motion generation system 102 utilizes a neural network encoder-decoder architecture to perform unsupervised learning of discrete human motion priors. FIG. 2 illustrates a human motion sequence 200 mapped to a discrete space. In particular, FIG. 2 illustrates a plurality of labeled representations (e.g., three-dimensional models) of varied range of human motions in a human motion sequence. FIG. 2 further illustrates the range of human motions mapped to the discrete space.

In one or more embodiments, a human motion sequence 200 includes a plurality of different types of human motions arranged in sequence according to natural movement of a human. Specifically, studies of human motions indicate that human motions fall into discrete categories. For instance, human motions for performing actions such as walking, running, dribbling a ball, and other actions are identifiable and fall into discrete categories. Accordingly, by learning the discrete categories of human motions and transitions between the motions, the human motion generation system 102 is able to map the discrete motions to a latent space for accurate and efficient reconstruction of sequences of human motions that fall into different categories.

According to one or more embodiments, as illustrated in FIG. 2, a human motion (e.g., a human motion category or human motion type) corresponds to an action involving includes one or more movements of a human body. To illustrate, for a first action of "receiving a ball with both hands," a first human motion 202a involves a person moving limbs and a torso to catch a ball (not shown). Furthermore, for a second action of "transferring a ball to the left hand," a second human motion 202b involves the person switching the ball from both hands to the left hand via various limb/torso movements. Additionally, a third action of "sprinting" and a fourth action of "dribbling the ball with the left hand" correspond to a third human motion 202c and a fourth human motion 202d, respectively, each involving different limb/torso movements. As illustrated in FIG. 2, each of the human motions 202a-202d includes a plurality of representations of the corresponding movements (e.g., three-dimensional models animating the movements).

In one or more embodiments, the human motion sequence 200 also includes one or more transitions between different human motions. For instance, as illustrated in FIG. 2, the human motion sequence 200 includes a transition 204 between the first human motion 202a and the second human motion 202b. According to one or more embodiments, the transition 204 includes one or more movements between two different human motions and not specifically tied to its own categorized human motion. To illustrate, FIG. 2 illustrates the transition 204 including movements specific to a state of the human body occurring between receiving the ball with both hands and transferring the ball to the left hand, but not specifically corresponding to either of the two actions. Accordingly, different sequences of human motions can include different transitions unique to the combinations of human motions.

FIG. 2 further illustrates a discrete latent space 206 corresponding to human motions. In one or more embodiments, the discrete latent space 206 includes a representation of possible values of encoded features (e.g., feature representations or embeddings) associated with human motions. For example, the discrete latent space 206 includes categorical regions in which human motions of the same or similar types or categories are positioned close together. Accordingly, semantically similar styles of walking are grouped in similar regions of the discrete latent space 206, jogging motions and running motions are grouped similarly within the discrete latent space 206, etc. Additionally, semantically distinct motions (e.g., jogging and sitting) are farther apart within the discrete latent space 206.

Figure 3:
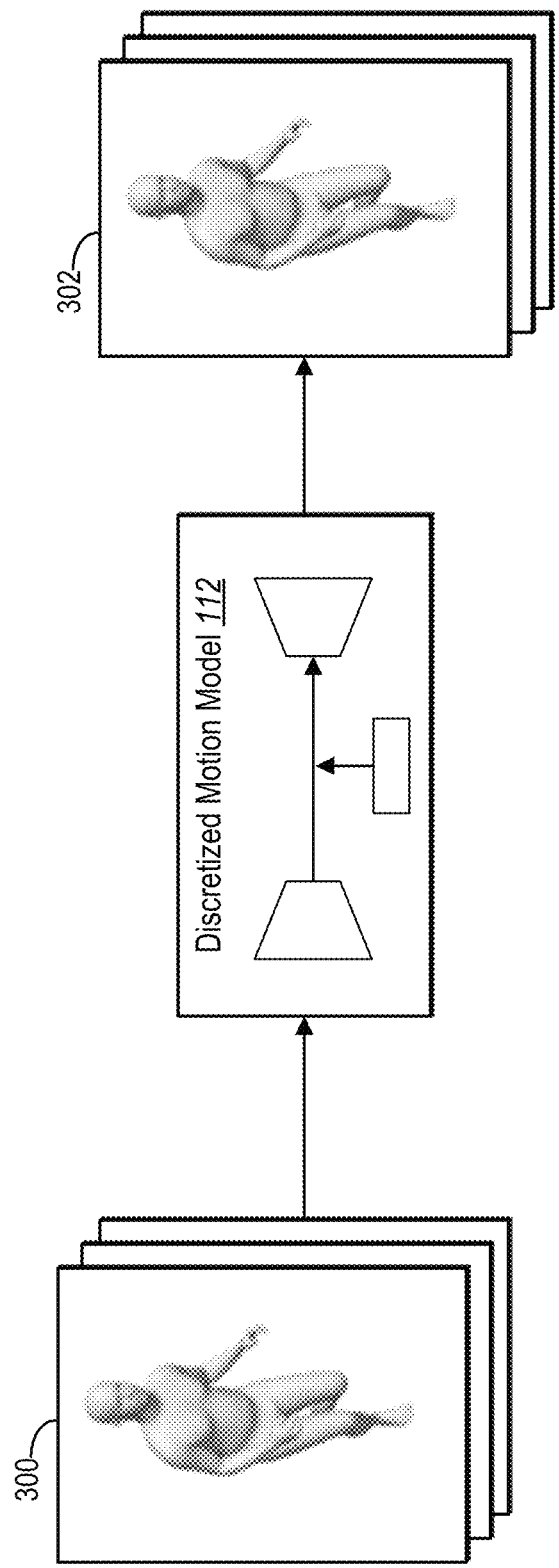
FIG. 3 illustrates a diagram of an overview of a discretized motion model reconstructing a human motion sequence in accordance with one or more implementations.

As described in more detail below, the human motion generation system 102 learns a discrete latent space (e.g., latent feature representations within the discrete latent space) utilizing an encoder-decoder neural network architecture. For example, the human motion generation system 102 utilizes unsupervised learning to learn a discrete latent space by reconstructing human motion sequences from a digital scene. FIG. 3 illustrates a diagram in which the human motion generation system 102 utilizes the discretized motion model 112 to extract features within a discrete latent space from a digital scene including a human motion sequence 300. FIG. 3 further illustrates that the human motion generation system 102 utilizes the discretized motion model 112 to generate a reconstructed human motion sequence 302 from the extracted features.

Figure 4:
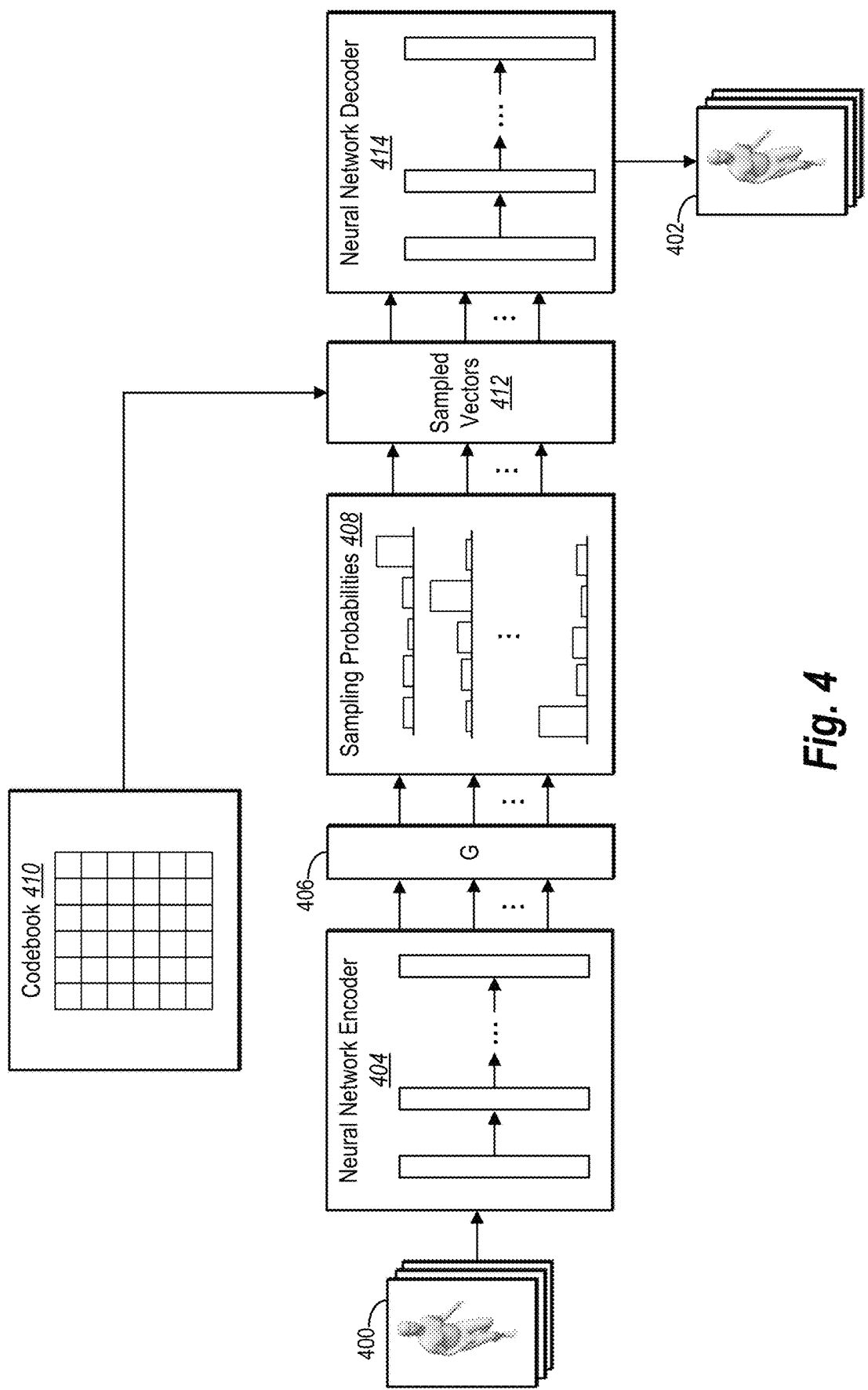
FIG. 4 illustrates a diagram of the human motion generation system utilizing an encoder-decoder architecture to reconstruct a human motion sequence in accordance with one or more implementations.

According to one or more embodiments, and as described in more detail with respect to FIG. 4, the human motion generation system 102 utilizes the discretized motion model 112 to generate latent feature representations of the human motion sequence 300 from one of various sources. The discretized motion model 112 converts a plurality of human motions of the human motion sequence 300 into the latent feature representations. Additionally, the human motion generation system 102 utilizes the discretized motion model 112 to generate the reconstructed human motion sequence 302 based on the latent feature representations. In one or more embodiments, the latent feature representations include hidden feature vectors representing attributes of the human motions mapped to a continuous latent feature space.

Figure 5A:
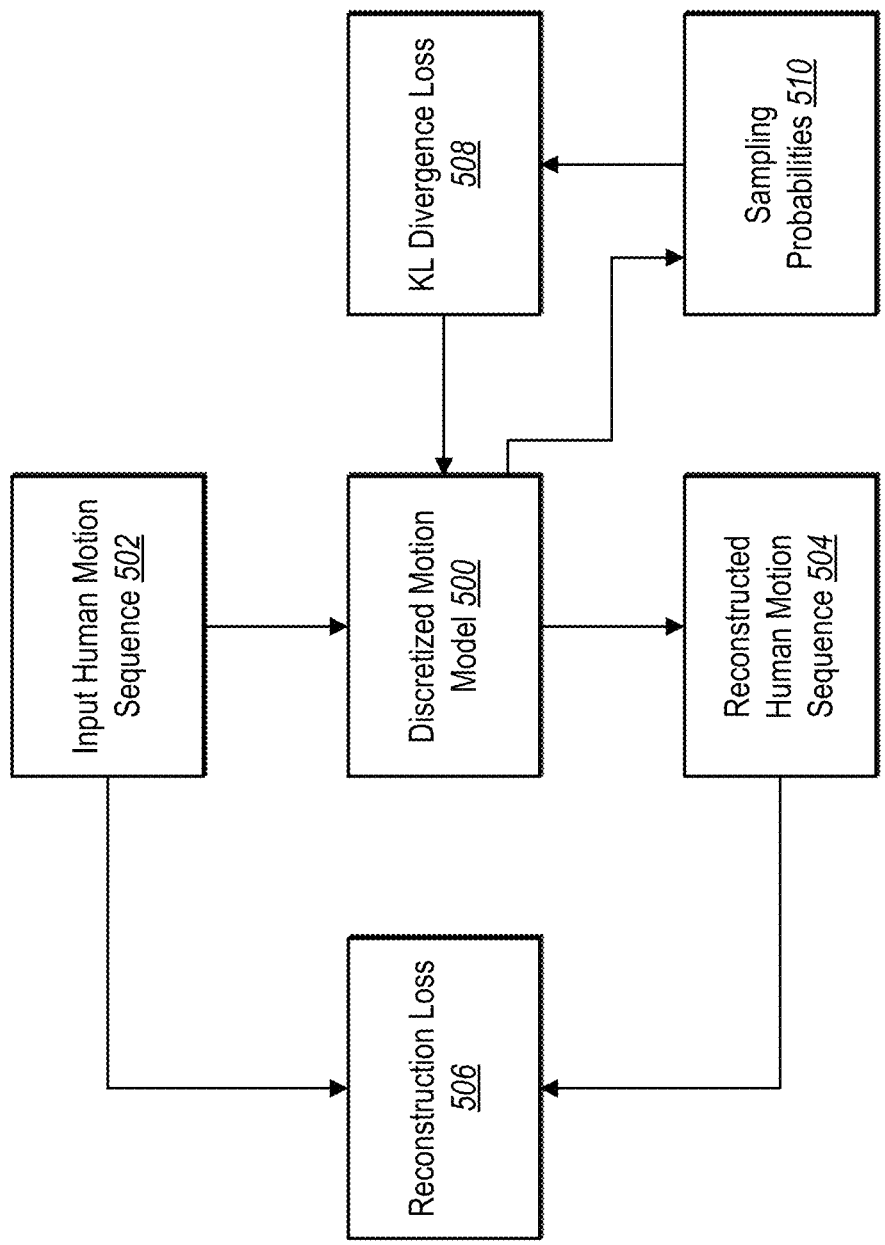
FIGS. 5A-5B illustrate diagrams of the human motion generation system determining a plurality of losses for learning parameters of a discretized motion model in accordance with one or more implementations.
Figure 5B:
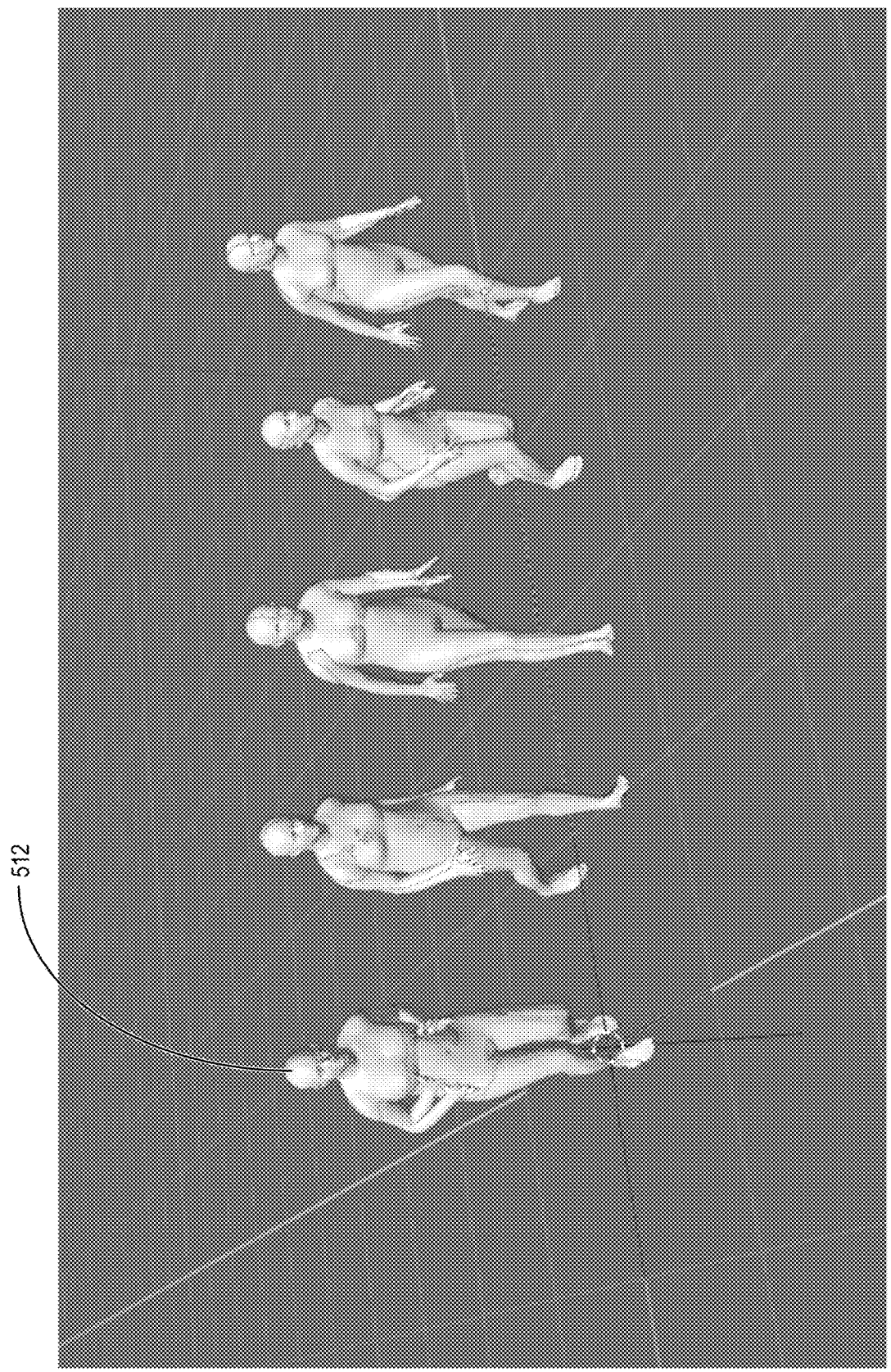

In one or more embodiments, as described in more detail with respect to FIGS. 5A-5B, the human motion generation system 102 also utilizes one or more losses to further train the discretized motion model 112. In particular, the human motion generation system 102 determines one or more losses based on the human motion sequence 300, the reconstructed human motion sequence 302, or data generated by the discretized motion model 112. The human motion generation system 102 utilizes the loss(es) to learn or update parameters of the discretized motion model 112 including, but not limited to, parameters of an encoder, a decoder, a codebook, or a distribution discretization layer.

As mentioned, FIG. 4 illustrates a diagram of the human motion generation system 102 utilizing a discretized motion model including an encoder-decoder architecture to reconstruct a human motion sequence 400. Specifically, FIG. 4 illustrates that the discretized motion model includes a neural network encoder-decoder architecture for encoding features of the human motion sequence 400. Additionally, FIG. 4 illustrates that the discretized motion model utilizes learned latent feature vectors to discretize the encoded features of the human motion sequence 400. Furthermore, the discretized motion model utilizes the discretized features to generate a reconstructed human motion sequence 402.

In one or more embodiments, the human motion generation system 102 determines the human motion sequence 400 from a digital scene. For example, the human motion generation system 102 determines the human motion sequence 400 from a three-dimensional scene including three-dimensional model representations of human motions. To illustrate, the human motion generation system 102 utilizes a model with a predefined number of joints in for human pose representations with movements corresponding to specific human motions in the human motion sequence 400. Additionally, the human motion generation system 102 identifies an origin of a three-dimensional environment including the model such as a ground projection of a root joint of the model at a first frame of the human motion sequence 400. In alternative implementations, the human motion generation system 102 determines the human motion sequence 400 from digital video including real-world human motions.

In additional embodiments, the human motion generation system 102 utilizes a discretized motion model including a neural network encoder 404 to extract features of the human motion sequence 400 within a latent feature space. In particular, the neural network encoder 404 generates a sequence of latent feature representations to indicate the human motions in the human motion sequence 400 within the latent feature space. For example, the neural network encoder 404 includes a plurality of convolutional neural network layers for generating the latent feature representations of the human motion sequence 400. Alternatively, the neural network encoder 404 includes a plurality of transformer neural network layers for generating the latent feature representations of the human motion sequence 400.

In one or more embodiments, the human motion generation system 102 converts the sequence of latent feature representations to a plurality of sampling probabilities 408 corresponding to discretized feature representations of human motions. Specifically, as illustrated in FIG. 4, the human motion generation system 102 utilizes a distribution discretization layer 406 to convert the sequence of latent feature representations to sets of sampling probabilities. For instance, the distribution discretization layer 406 includes a softmax layer to determine a set of sampling probabilities for each latent feature representation in the sequence of latent feature representations. To illustrate, the human motion generation system 102 utilizes a neural network softmax layer to convert the latent feature representations into sampling probabilities. Alternatively, the distribution discretization layer 406 includes a Gumbel-softmax layer, as described by Eric Jang, Shixiang Gu, and Ben Poole in "Categorical reparameterization with Gumbel-Softmax," (2016), which is herein incorporated by reference in its entirety.

According to one or more embodiments, the sampling probabilities determined by the distribution discretization layer 406 correspond to a codebook 410 of learned latent feature representations. In particular, a set of sampling probabilities for a particular latent feature representation include probabilities that the latent feature representation corresponds to a plurality of discrete human motions. Additionally, in one or more embodiments, the codebook 410 includes a plurality of discretized feature representations (e.g., discrete latent feature vectors) corresponding to the discrete human motions in the discrete latent space. Accordingly, the set of sampling probabilities for the particular latent feature representation includes one or more probabilities that the latent feature representation corresponds to the discrete human motions according to the codebook 410.

In some embodiments, the human motion generation system 102 utilizes the distribution discretization layer 406 to generate the sampling probabilities 408 by performing a relaxed quantization with a strong activation to a given entry of the codebook 410 while also determining small sampling probabilities corresponding to other entries of the codebook 410. For instance, the distribution discretization layer 406 generates a first set of sampling probabilities for a first latent feature representation in the sequence of latent feature representations by providing a high sampling probability for a first codebook entry and low sampling probabilities for the other entries in the codebook 410. The distribution discretization layer 406 also generates a second set of sampling probabilities for a second latent feature representation by providing a high sampling probability for a second codebook entry and low sampling probabilities for the other entries in the codebook 410.

According to one or more embodiments, the human motion generation system 102 utilizes the sampling probabilities 408 to sample from the codebook 410. In particular, as illustrated in FIG. 4, the human motion generation system 102 converts the sequence of latent feature representations to a sequence of discretized feature representations ("sampled vectors 412" in FIG. 4) by sampling the learned latent feature representations of the codebook 410 according to the sampling probabilities 408. To illustrate, the human motion generation system 102 determines discrete human motions in the discrete latent space by sampling, for each latent feature representation, a learned latent feature representation corresponding to a human motion according to a corresponding set of sampling probabilities for the latent feature representation. For example, the human motion generation system 102 samples a first discretized feature representation from the codebook 410 according to a first set of sampling probabilities, a second discretized feature representation from the codebook 410 according to a second set of sampling probabilities, etc.

In some embodiments, the human motion generation system 102 determines the sampled vectors 412 by combining the sampling probabilities 408 with a feature representation matrix of the codebook 410. As mentioned, the codebook 410 can include a feature representation matrix of a plurality of learned feature representations for discrete human motions. Thus, the human motion generation system 102 determines the sampled vectors 412 by determining a dot product of the sampling probabilities 408 and the feature representation matrix of the codebook 410. The resulting sampled vectors 412 include a sequence of discretized feature representations based on the sequence of latent feature representations produced by the neural network encoder 404.

In alternative embodiments, the human motion generation system 102 discretizes the latent feature representations without the distribution discretization layer of FIG. 4. For instance, the human motion generation system 102 converts the sequence of latent feature representations generated by the neural network encoder 404 to discrete latent feature representations utilizing full quantization. To illustrate, rather than utilizing a softmax layer that provides relaxed quantization for generating a set of sampling probabilities for a given latent feature representation, the human motion generation system 102 utilizes full quantization to provide a single possible entry for sampling a discretized feature representation from the codebook 410. While utilizing full discretization provides discretization of human motions, the human motion generation system 102 can ease the convergence resulting from sampling from the codebook 410 by utilizing the distribution discretization layer 406.

In additional embodiments, the human motion generation system 102 determines random samples from the codebook 410 according to the sampling probabilities 408. To illustrate, the human motion generation system 102 performs sampling on the codebook 410 with the sampling weighted according to the sampling probabilities 408. Accordingly, when sampling from the codebook 410 for a given latent feature representation, the human motion generation system 102 likely samples from the entry with the highest sampling probability for a given latent feature representation but with a small possibility of sampling from one of the other entries.

In one or more embodiments, the human motion generation system 102 utilizes the sampled vectors 412 to generate the reconstructed human motion sequence 402. In particular, the human motion generation system 102 utilizes a neural network decoder 414 to convert the sampled vectors 412 into the reconstructed human motion sequence 402. In one or more embodiments, the neural network decoder 414 includes a plurality of convolutional neural network layers for generating the reconstructed human motion sequence 402 from the discretized feature representations. Alternatively, the neural network encoder 404 includes a plurality of transformer neural network layers for generating the reconstructed human motion sequence 402 from the discretized feature representations.

According to one or more embodiments, after generating the reconstructed human motion sequence 402, the human motion generation system 102 can use the reconstructed human motion sequence 402 in a number of different applications. For example, the human motion generation system 102 generates a three-dimensional model based on the reconstructed human motion sequence 402 including a sequence of three-dimensional objects in a three-dimensional environment. In additional examples, the human motion generation system 102 generates a digital video including the reconstructed human motion sequence 402. In some embodiments, the human motion generation system 102 utilizes the reconstructed human motion sequence 402 to generate a neural network-based motion graph with discrete motions mapped to a discrete latent feature space for use in a number of different applications. Furthermore, as described in more detail with respect to FIG. 5A, the human motion generation system 102 utilizes the reconstructed human motion sequence 402 to train components of a discretized motion model.

In one or more embodiments, to reconstruct a human motion sequence as illustrated in FIG. 4, the human motion generation system 102 processes a human motion sequence based on a human body model with 22 joints (excluding left hand joints and right hand joints) for a human pose representation. In particular, the human motion generation system 102 represents a human motion sequence by joint angles and their positions relative to an origin. For instance, the origin is a ground projection of a root joint at the first frame of the human motion sequence. More specifically, the origin is rotated along a vertical axis such that a front axis (e.g., +z-axis) of the origin is aligned with the body's facing direction at the first frame. Additionally, the human motion generation system 102 represents all joint angles using a 6-dimensional format as described by Yi Zhou, Connelly Barnes, and Jingwan Lu in "On the continuity of rotation representations in neural networks," Adobe Research (2018), which is herein incorporated by references in its entirety. Furthermore, a human motion sequence with T frames is represented as: $x=(x_1, \ldots, x_T)$, $x_t \in \mathbb{R}^{198}$ (e.g., a 22×9 tensor).

In additional embodiments, the human motion generation system 102 utilizes a discretized motion model (e.g., a discrete variational autoencoder) that includes a discrete latent space codebook and three blocks: 1) an encoder, 2) a discrete sampler, and 3) a decoder. In one or more embodiments, the codebook is represented as $E \in \mathbb{R}^{K \times D}$, in which K is the number of discrete feature representations (e.g., vectors) in the codebook, and D is the dimension of each discrete feature representation.

The human motion generation system 102 also defines the encoder with weights θ as $\mathcal{E}_\theta$. The encoder receives an input human motion sequence and encodes the sequence into a continuous space embedding $\tilde{z} \in \mathbb{R}^{N \times K}$, in which N is the number of codebook vectors for encoding a sequence via $\tilde{z} = \mathcal{E}_\theta(x)$. The human motion generation system 102 utilizes the discrete sampler to convert each row of the embedding $\tilde{z}$ into sampling probabilities. In one or more embodiments, the discrete sampler includes a Gumbel-softmax function $\mathcal{G}$. The sampling probabilities allow the human motion generation system 102 to sample the latent code z from the codebook E as $z = \mathcal{G}(\tilde{z}) \cdot E$. The human motion generation system 102 feeds the latent code z to the decoder $\mathcal{D}_\phi$, with weights ϕ, to obtain the reconstructed human motion sequence $\tilde{x}$ as $\tilde{x} = \mathcal{D}_\phi(z)$.

As indicated previously, the human motion generation system 102 can utilize a variety of architectures for an encoder and/or a decoder. In one or more embodiments, the human motion generation system 102 utilizes an encoder and/or decoder including one or more convolutional neural network layers. For instance, an encoder including convolutional neural network layers includes a one-dimensional input convolutional layer followed by a plurality of residual blocks (e.g., four residual blocks). The input layer and residual blocks also include Gaussian error linear units (GELU) non-linearity at the outputs. Additionally, the human motion generation system 102 utilizes one-dimensional convolutions in the residual blocks with GELU activation. The human motion generation system 102 further utilizes a decoder with a similar structure as the encoder without the input convolutional layer and with an added deconvolutional layer after the residual blocks.

In alternative embodiments, the human motion generation system 102 utilizes an encoder and/or decoder including a transformer architecture. Specifically, the encoder includes a linear input layer, a positional encoding layer, a plurality of transformer encoder layers (e.g., eight layers) with a plurality of heads (e.g., four), and an additional linear layer at the end. Additionally, the decoder includes a plurality of transformer encoder layers with a plurality of heads, and a linear layer at the end.

As mentioned, the human motion generation system 102 trains a discretized motion model including an encoder-decoder architecture with codebook discretization. FIG. 5A illustrates an embodiment of the human motion generation system 102 determining a plurality of losses for training a discretized motion model 500. In particular, the human motion generation system 102 learns parameters of one or more components of the discretized motion model 500 based on the losses to more accurately reproduce a sequence of human motions via discretization of the human motions. For example, as illustrated in FIG. 5A, the discretized motion model 500 receives an input human motion sequence 502 and generates a reconstructed human motion sequence 504.

According to one or more embodiments, as illustrated in FIG. 5A, the human motion generation system 102 determines a reconstruction loss 506 based on the reconstructed human motion sequence 504. For example, the human motion generation system 102 determines the reconstruction loss 506 by comparing the reconstructed human motion sequence 504 to the input human motion sequence 502. The human motion generation system 102 thus determines the reconstruction loss 506 based on the resulting differences between the reconstructed human motion sequence 504 and the input human motion sequence 502. In some instances, the human motion generation system 102 determines differences between individual frames or model positions/poses in the reconstructed human motion sequence 504 and the input human motion sequence 502, as described in more detail below. In one or more embodiments, the human motion generation system 102 determines the reconstruction loss 506 as $\mathcal{L}_{rec} = \|x - \tilde{x}\|^2$.

In addition to determining the reconstruction loss 506, in one or more embodiments, the human motion generation system 102 determines a distribution loss. Specifically, as illustrated in FIG. 5A, the human motion generation system 102 determines a Kullback-Leibler divergence loss ("KL divergence loss") 508. Specifically, the human motion generation system 102 determines the KL divergence loss 508 based on sampling probabilities 510 generated by a distribution discretization layer of the discretized motion model 500. For instance, the human motion generation system 102 determines the KL divergence loss 508 as a regularization term for encouraging full utilization of the codebook within the discretized motion model 500 such that a softmax normalized sampling vector $\tilde{z}$ is uniformly distributed (e.g., without bias towards only a few specific discretized feature representations in the codebook).

To illustrate, the human motion generation system 102 determines the KL divergence loss 508 as $$\mathcal{L}_{KL} = \frac{1}{NK}\sum \mathcal{S}(\tilde{z})(\log \mathcal{S}(\tilde{z}) - \log(1/K)),$$

in which $\mathcal{S}$ represents the softmax function. Additionally, in one or more embodiments, the human motion generation system 102 utilizes an annealing scheme for the temperature τ of the Gumbel-softmax function $\mathcal{G}$. The temperature τ at any given training epoch i is represented as $\tau(i) = \max\{\exp^{-ri}, \tau_{min}\}$, in which r represents the annealing rate. In some embodiments, the human motion generation system 102 utilizes r=0.001 and $\tau_{min}$=0.5, although the human motion generation system 102 can use other values or ranges of values, depending on the implementation. In additional embodiments, the human motion generation system 102 utilizes other losses in addition to, or instead of, the KL divergence loss such as Renyi divergence, f-divergence, or cross entropy losses.

Additionally, in connection with determining the reconstruction loss 506 and the KL divergence loss 508, the human motion generation system 102 trains the discretized motion model 500. For example, the human motion generation system 102 combines the reconstruction loss 506 and the KL divergence loss 508 into a single loss. To illustrate, the human motion generation system 102 combines the losses as $\mathcal{L} = \mathcal{L}_{rec} + \mathcal{L}_{KL}$ with equal weights, although the human motion generation system 102 may utilize different weights for the different losses. The human motion generation system 102 trains the discretized motion model 500 on the combined loss by learning/updating parameters of the encoder, decoder, distribution discretization layer, and codebook. In alternative embodiments, the human motion generation system 102 trains the discretized motion model 500 separately on the reconstruction loss 506 and the KL divergence loss 508.

FIG. 5B illustrates a plurality of representations of human motions sampled from a human motion sequence overlaid with corresponding reconstructed human motions from a reconstructed human motion sequence. In particular, as FIG. 5B illustrates, a first representation 512 includes a first human motion sampled from an input human motion sequence and a corresponding reconstructed human motion overlaid with the first human motion. As shown, the first human motion sampled from the input sequence and the corresponding reconstructed human motion have differences in model positioning and joint angles. As further shown, a plurality of additional representations also illustrate differences between various human motions from the input sequence and their corresponding reconstructed human motions. When determining a reconstruction loss, the human motion generation system 102 thus determines the loss based on the differences between the input sequence and the reconstructed sequence.

According to one or more embodiments, the human motion generation system 102 utilizes a dataset including a plurality of human motion sequences in digital videos with a set frame rate (i.e., 11,893 sequences with frame rate of 30). For a given motion sequence, the human motion generation system 102 randomly samples continuous 25 frames to provide as input human motion sequences to the discretized motion model. In some instances, the human motion generation system 102 utilizes a specific set of model poses or model shapes from which the human motion generation system 102 samples sequences for training the discretized motion model.

In one or more embodiments, experimenters obtained experimental data that verifies the reconstruction performance of the discretized motion model via a plurality of metrics. Specifically, the experimental data utilizes the discretized motion model to receive orientations and positions of body joints relative to the origin and attempts to reconstruct the orientations/positions of the body joints relative to the origin similar to the input. The experimental data transforms the output orientations to obtain joint orientations relative to a parent joint.

According to one or more embodiments, the articulated pose reconstruction error for a joint includes the relative angle between the input and the output rotation matrices corresponding to the joint. The mean articulated pose reconstruction error $P_{err}$ for a frame based on a body with 22 joints is determined by $$P_{err} = \frac{1}{22}\sum_{j=1}^{22} \left| \arccos(0.5 * Tr(R_j \cdot \tilde{R}_j) - 1) \right|,$$

in which $R_j$ and $\tilde{R}_j$ represent the input and output rotation matrices for the joint j, respectively. Additionally, the experimental data determines the translation reconstruction error for a frame as $T_{err}=\|\tilde{p}_{root}-p_{root}\|$, in which $p_{root}$ and $\tilde{p}_{root}$ represent the position of the root joint in the input frame and the output frame, respectively.

In some cases, "foot sliding" refers to generated motion slides against a floor when in contact, resulting in perceptually and physically unrealistic movements. The experimental data evaluates the foot sliding performance of the discretized motion model by calculating average drift of the feet at the time of contact with the floor. The experimental data also utilizes contact timings provided for the dataset of sequences and determines the drift of the feet at the time of contact with the floor. For the input data, the drift at the time of contact t is determined as $F_{err}=\|p_{foot,t}-p_{foot,t-1}\|$, where $p_{foot,t}$ is the position of the foot at time t.

In addition to determining the metrics above, the experimental data includes an ablation study indicating the performance of the human motion generation system 102 in connection with a convolution-based architecture ("Conv") and a transformer-based architecture ("Tfm") with both a discrete latent space and a continuous latent space. As indicated in Table 1 below, the transformer-based architecture provides comparable or improved reconstruction and foot sliding error than the convolution-based architecture. The convolution-based architecture, however, provides faster and easier training than the transformer-based architecture. The convolution-based architecture also provides inductive bias of maintaining temporal information intact in the output of the discretized motion model, which can be useful for applications such as motion mixing and generating motion transitions in the latent space.

|  | $P_{err}$(deg) | $T_{err}$(cm) | $F_{err}$(cm) |
| --- | --- | --- | --- |
| Ground-Truth Data | — | — | 1.51/1.08 |
| Conv (discrete) | 6.09/8.21 | 3.19/4.14 | 2.36/2.14 |
| Tfm (discrete) | 6.37/8.29 | 3.04/3.81 | 1.07/0.92 |
| Conv (continuous) | 4.18/5.75 | 1.74/2.16 | 1.64/1.38 |
| Tfm (continuous) | 5.89/7.73 | 2.43/2.96 | 1.12/0.95 |
| Conv (discrete) (K = 1000) | 6.14/8.30 | 3.22/4.13 | 2.35/2.13 |
| Conv (discrete) (r = 0.005) | 6.47/8.58 | 3.40/4.29 | 2.42/2.14 |

As mentioned, for comparing the discretized latent space to a continuous latent space, experimenters trained a variational autoencoder ("VAE") model with a reconstruction loss and a KL divergence loss on the prior. Additionally, the experimenters added a linear layer after the encoder to accumulate information from all frames into a single latent feature representation. The experimenters also added a linear layer at the input of the decoder to reshape the latent feature representation back to the number of frames in the input sequence. As shown, the discretized motion model of the human motion generation system 102 provides comparable reconstruction quality. Additionally, while the VAE model provides accurate reconstructions based on the inputs, the VAE model is incompatible with applications that perform motion mixing in time (e.g., while maintaining temporal information associated with the motion sequence).

Figure 6A:
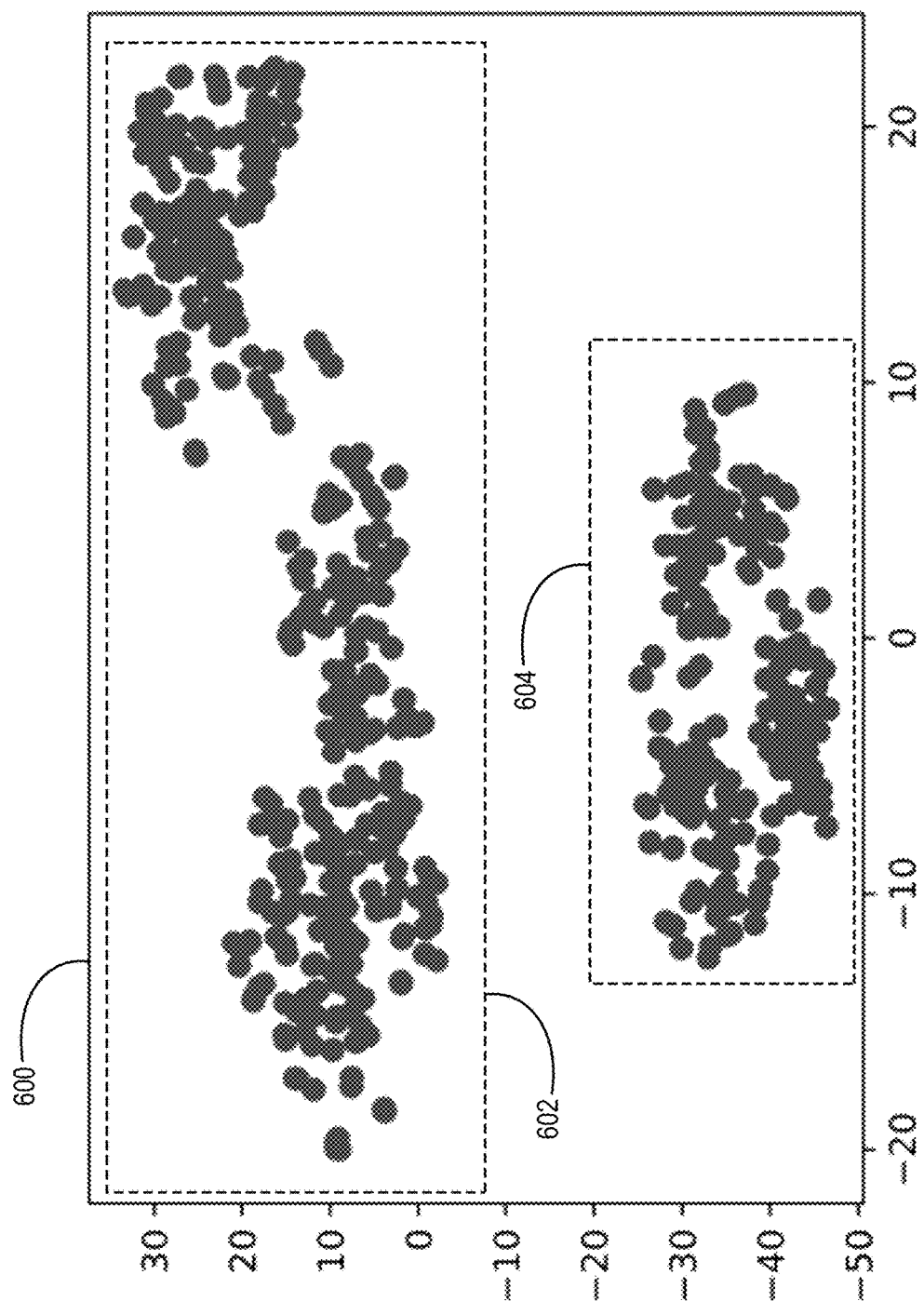
FIGS. 6A-6B illustrate diagrams of human motion representations sampled from a latent space in accordance with one or more implementations.

In addition to providing accurate reconstruction of human motion sequences via a discrete latent space, the human motion generation system 102 provides accurate discretization of human motion categories in the discrete latent space. FIG. 6A illustrates a diagram of a discrete latent space 600. As illustrated in FIG. 6A, the human motion generation system 102 accurately clusters different human motion sequences into different regions of the discrete latent space 600. To illustrate, a first cluster 602 includes motion sequences corresponding to a first category (e.g., running), and a second cluster 604 includes motion sequences corresponding to a second category (e.g., walking). Thus, while running and walking sequences may include some similarities in human body movements, the human motion generation system 102 is able to accurately distinguish the motions for mapping within the discrete latent space 600.

Figure 6B:
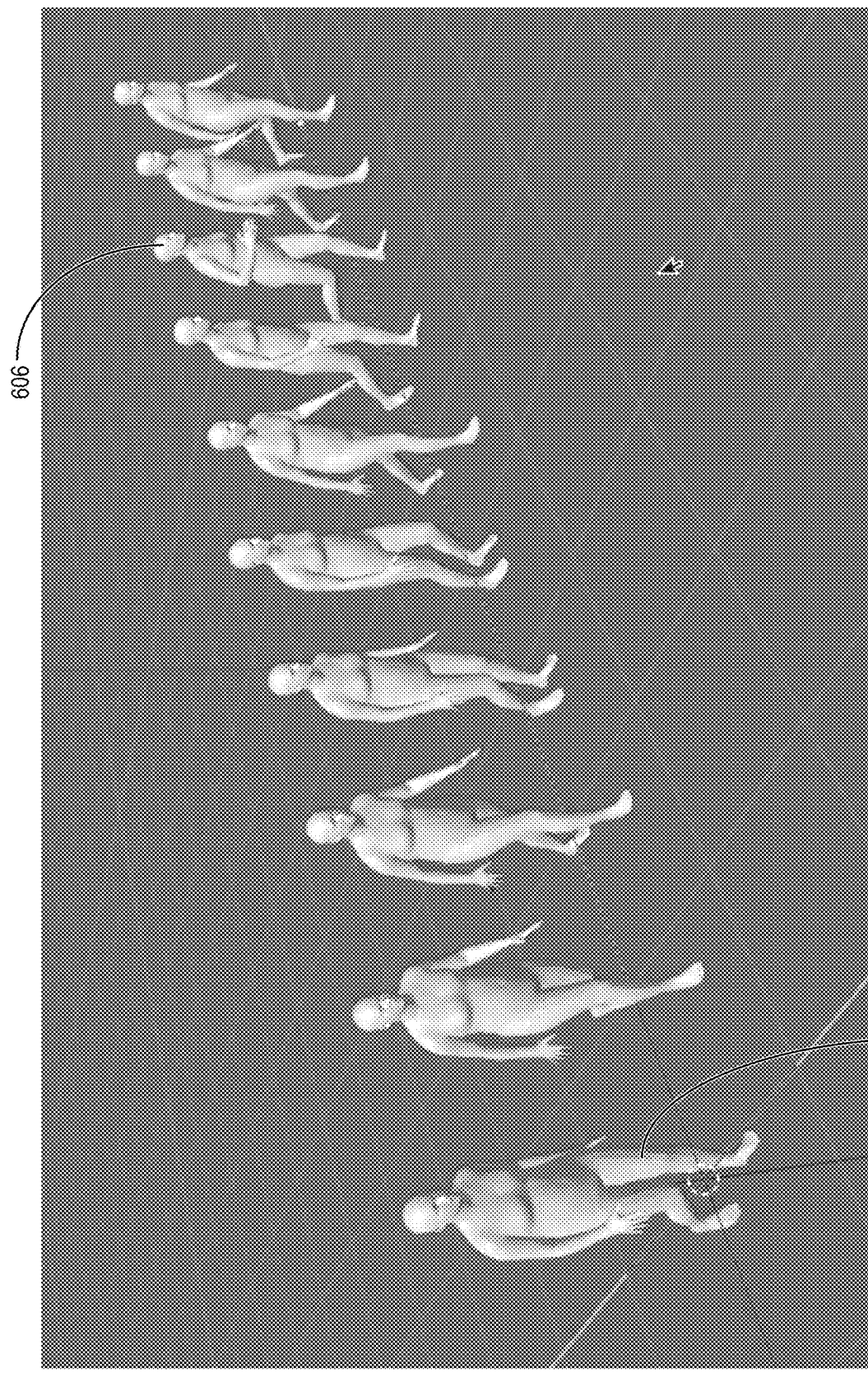

FIG. 6B illustrates a plurality of three-dimensional models corresponding to different human motion sequences featured from the discrete latent space 600. Specifically, because the human motion generation system 102 accurately clusters different human motion sequences into different regions of the discrete latent space 600, randomly sampling within the clusters corresponding to different human motion sequences provides accurate reconstructions for the respective motion categories. To illustrate, a first model 606 represents a reconstruction of a sequence sampled from the first cluster 602 corresponding to a running sequence, and a second model 608 represents a reconstruction of a sequence sampled from the second cluster 604 corresponding to a walking sequence.

Figure 7:
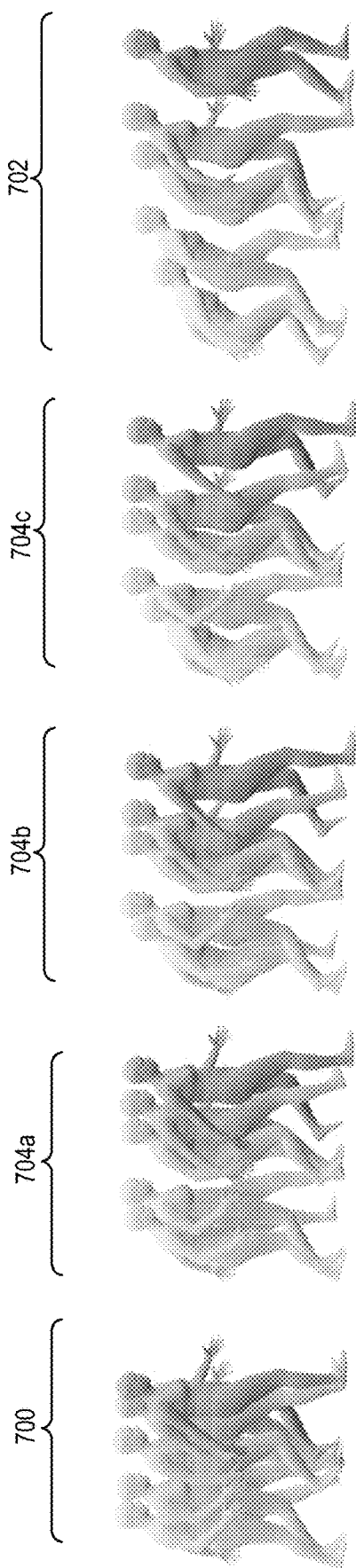
FIG. 7 illustrates a diagram of a plurality of human motion sequences in accordance with one or more implementations.

FIG. 7 illustrates a plurality of human motion sequences based on a dataset of human motion sequences and reconstructed human motion sequences. In particular, a first human motion sequence 700 and a second human motion sequence 702 include different reconstructions of a walking sequence and a running sequence, respectively, randomly sampled from a dataset of human motion sequences. Additionally, FIG. 7 illustrates a plurality of reconstructions of interpolated human motion sequences 704a-704c that correspond to interpolations of continuous space embeddings. For example, the human motion generation system 102 determines an interpolated sequence as the reconstruction of linear combinations of the continuous space embeddings of two sequences. To illustrate, for continuous space embeddings $\tilde{z}_{s_1}$ and $\tilde{z}_{s_2}$ of sequences $s_1$ and $s_2$, the human motion generation system 102 determines interpolated continuous space embeddings $\tilde{z}_{s_1,s_2}^w$ as $\tilde{z}_{s_1,s_2}^w = w * \tilde{z}_{s_1} + (1-w) * \tilde{z}_{s_2}$, in which w represents a weighting component. The human motion generation system also passes $\tilde{z}_{s_1,s_2}^w$ through a discrete sampler and a decoder to generate the interpolated human motion sequence.

As illustrated in FIG. 7, a first interpolated human motion sequence 704a corresponds to a reconstruction of the interpolated continuous space embedding $\tilde{z}_{walk,run}^{0.75}$. Additionally, a second interpolated human motion sequence 704b corresponds to a reconstruction of the interpolated continuous space embedding $\tilde{z}_{walk,run}^{0.5}$. A third interpolated human motion sequence 704c corresponds to a reconstruction of the interpolated continuous space embedding $\tilde{z}_{walk,run}^{0.25}$. As illustrated, the interpolated sequences include smooth motions and smooth pose interpolations while taking global translation into account. The motions indicate that the model covers a greater distance when the running component is increased in the motion.

As previously indicated, the human motion generation system 102 provides consistent temporal information in the discrete latent space. Specifically, by utilizing a convolution-based encoder-decoder architecture, the human motion generation system 102 allows for editing motions temporally in the discrete latent space. For instance, the human motion generation system 102 selects one or more latent feature representations from a first human motion sequence and one or more latent feature representations from a second human motion sequence. The human motion generation system 102 generates transitions by filling in one or more movements using interpolation. To illustrate, to obtain the first $t_1$ frames from motion $s_1$ and frames from $t_2$ onward (e.g., for 25 total frames represented by 25 latent feature representations) to be from $s_2$, the human motion generation system 102 determines a space time interpolation of the continuous space embeddings as $\tilde{z}_{s_1,s_2}^{t^1,t^2} = (\tilde{z}_{s_1 0:t_1}, (1-\mathcal{R}) * \tilde{z}_{s_1 t_1:t_2} + \mathcal{R} * \tilde{z}_{s_1 t_1:t_2}, \tilde{z}_{s_1 t_2:25})$, with $\mathcal{R}$ representing the weighting component.

Figure 8:
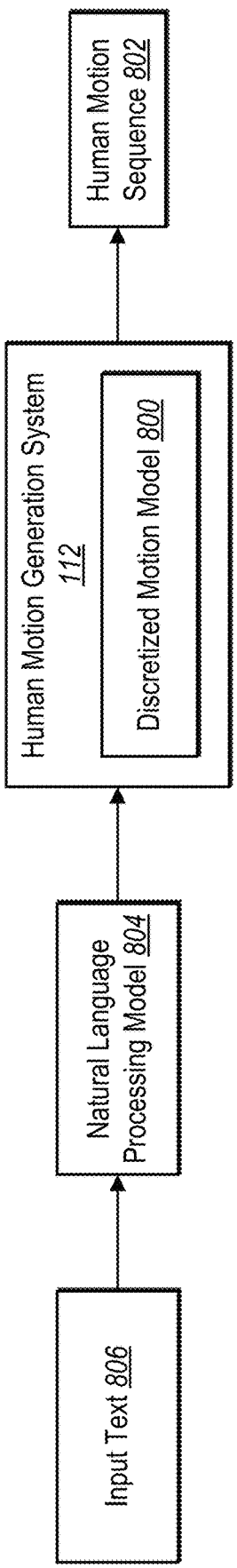
FIG. 8 illustrates a diagram of the human motion generation system utilizing natural language processing to generate a motion sequence from natural language input in accordance with one or more implementations.

In one or more embodiments, the human motion generation system 102 utilizes a trained discretized motion model to perform human motion sequence generation in a variety of applications. For example, FIG. 8 illustrates a diagram in which the human motion generation system 102 utilizes a discretized motion model 800 to generate a human motion sequence 802 based on natural language input. Specifically, as illustrated, the human motion generation system 102 utilizes a natural language processing model 804 to process input text 806 including one or more natural language phrases describing a desired output of the discretized motion model 800.

To illustrate, the input text 806 includes words, phrases, and/or sentences that indicate a human motion sequence to be reconstructed in a three-dimensional environment such as "A man sitting in a chair stands up, walks six steps to a table, picks up a book from the table, returns to the chair, and sits down." The natural language processing model 804 parses the input text 806 to determine an intent of the input text 806 based on, but not limited to, subjects, objects, nouns, etc. In some instances, the natural language processing model 804 utilizes semantic scene graphs to determine a sequence of human motions based on the intent of the input text 806. The discretized motion model 800 converts the determined sequence into a sequence of latent feature representations and generates the human motion sequence 802 based on the sequence of latent feature representations.

Although FIG. 8 illustrates the human motion generation system 102 utilizing natural language processing of the input text 806, in some implementations, the human motion generation system 102 processes audio/speech to determine a desired sequence. For example, the human motion generation system 102 first utilizes a speech-to-text model and then processes the resulting text utilizing the natural language processing model 804. Alternatively, the human motion generation system 102 utilizes an instruction parsing model to parse a set of instructions from an application (e.g., a three-dimensional modeling/development program) to convert the set of instructions into a sequence of latent feature representations. The human motion generation system 102 generates a human motion sequence based on the resulting sequence of latent feature representations.

Figure 9:
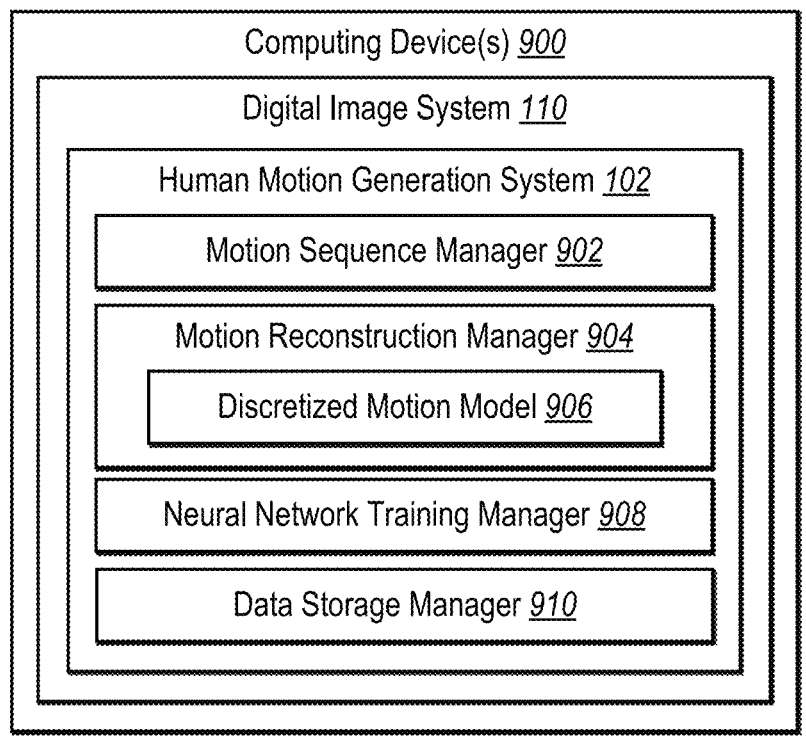
FIG. 9 illustrates a diagram of the human motion generation system of FIG. 1 in accordance with one or more implementations.

FIG. 9 illustrates a detailed schematic diagram of an embodiment of the human motion generation system 102 described above. As shown, the human motion generation system 102 is implemented in a digital image system 110 on computing device(s) 900 (e.g., a client device and/or server device as described in FIG. 1, and as further described below in relation to FIG. 11). Additionally, the human motion generation system 102 includes, but is not limited to, a motion sequence manager 902, a motion reconstruction manager 904 including a discretized motion model 906, a neural network training manager 908, and a data storage manager 910. The human motion generation system 102 can be implemented on any number of computing devices. For example, the human motion generation system 102 can be implemented in a distributed system of server devices for generating digital image content. The human motion generation system 102 can also be implemented within one or more additional systems. Alternatively, the human motion generation system 102 can be implemented on a single computing device such as a single client device.

In one or more embodiments, each of the components of the human motion generation system 102 is in communication with other components using any suitable communication technologies. Additionally, the components of the human motion generation system 102 are capable of being in communication with one or more other devices including other computing devices of a user, server devices (e.g., cloud storage devices), licensing servers, or other devices/systems. It will be recognized that although the components of the human motion generation system 102 are shown to be separate in FIG. 9, any of the subcomponents may be combined into fewer components, such as into a single component, or divided into more components as may serve a particular implementation. Furthermore, although the components of FIG. 9 are described in connection with the human motion generation system 102, at least some of the components for performing operations in conjunction with the human motion generation system 102 described herein may be implemented on other devices within the environment.

In some embodiments, the components of the human motion generation system 102 include software, hardware, or both. For example, the components of the human motion generation system 102 include one or more instructions stored on a computer-readable storage medium and executable by processors of one or more computing devices (e.g., the computing device(s) 900). When executed by the one or more processors, the computer-executable instructions of the human motion generation system 102 cause the computing device(s) 900 to perform the operations described herein. Alternatively, the components of the human motion generation system 102 can include hardware, such as a special purpose processing device to perform a certain function or group of functions. Additionally, or alternatively, the components of the human motion generation system 102 can include a combination of computer-executable instructions and hardware.

Furthermore, the components of the human motion generation system 102 performing the functions described herein with respect to the human motion generation system 102 may, for example, be implemented as part of a stand-alone application, as a module of an application, as a plug-in for applications, as a library function or functions that may be called by other applications, and/or as a cloud-computing model. Thus, the components of the human motion generation system 102 may be implemented as part of a stand-alone application on a personal computing device or a mobile device. Alternatively, or additionally, the components of the human motion generation system 102 may be implemented in any application that provides digital image modification, including, but not limited to ADOBE® AFTER EFFECTS®, ADOBE® ANIMATE®, and ADOBE® STOCK®.

The human motion generation system 102 includes a motion sequence manager 902 to manage human motion sequences. For example, the motion sequence manager 902 manages, or otherwise accesses, a database of unlabeled human motion sequences. To illustrate, the motion sequence manager 902 manages a plurality of human motion sequences including three-dimensional models in a plurality of different poses corresponding to various actions (e.g., running, walking, sitting, jumping).

The human motion generation system 102 also includes a motion reconstruction manager 904 to manage reconstruction of human motion sequences. Specifically, the motion reconstruction manager 904 utilizes a discretized motion model 906 to reconstruct human motion sequences from input human motion sequences. Additionally, the discretized motion model 906 includes an encoder-decoder architecture to convert input sequences to discretized latent feature representations and reconstruct the input sequences based on the discretized latent feature representations. In some embodiments, the motion reconstruction manager 904 also utilizes the discretized motion model 906 to convert text, speech, or instructions to reconstructed human motion sequences.

The human motion generation system 102 further includes a neural network training manager 908 to train components of the discretized motion model 906. For instance, the neural network training manager 908 determines one or more losses (e.g., a reconstruction loss and a KL divergence loss) based on a reconstructed human motion sequence. The neural network training manager 908 utilizes the losses to learn parameters of an encoder, a decoder, a codebook, and/or a distribution discretization layer.

The human motion generation system 102 also includes a data storage manager 910 (that comprises a non-transitory computer memory/one or more memory devices) that stores and maintains data associated with human motion sequences. For example, the data storage manager 910 stores data associated with reconstructing human motion sequences. To illustrate, the data storage manager 910 stores neural network(s), a codebook corresponding to discrete human motions, latent feature representations, and reconstructed human motion sequences.

Figure 10:
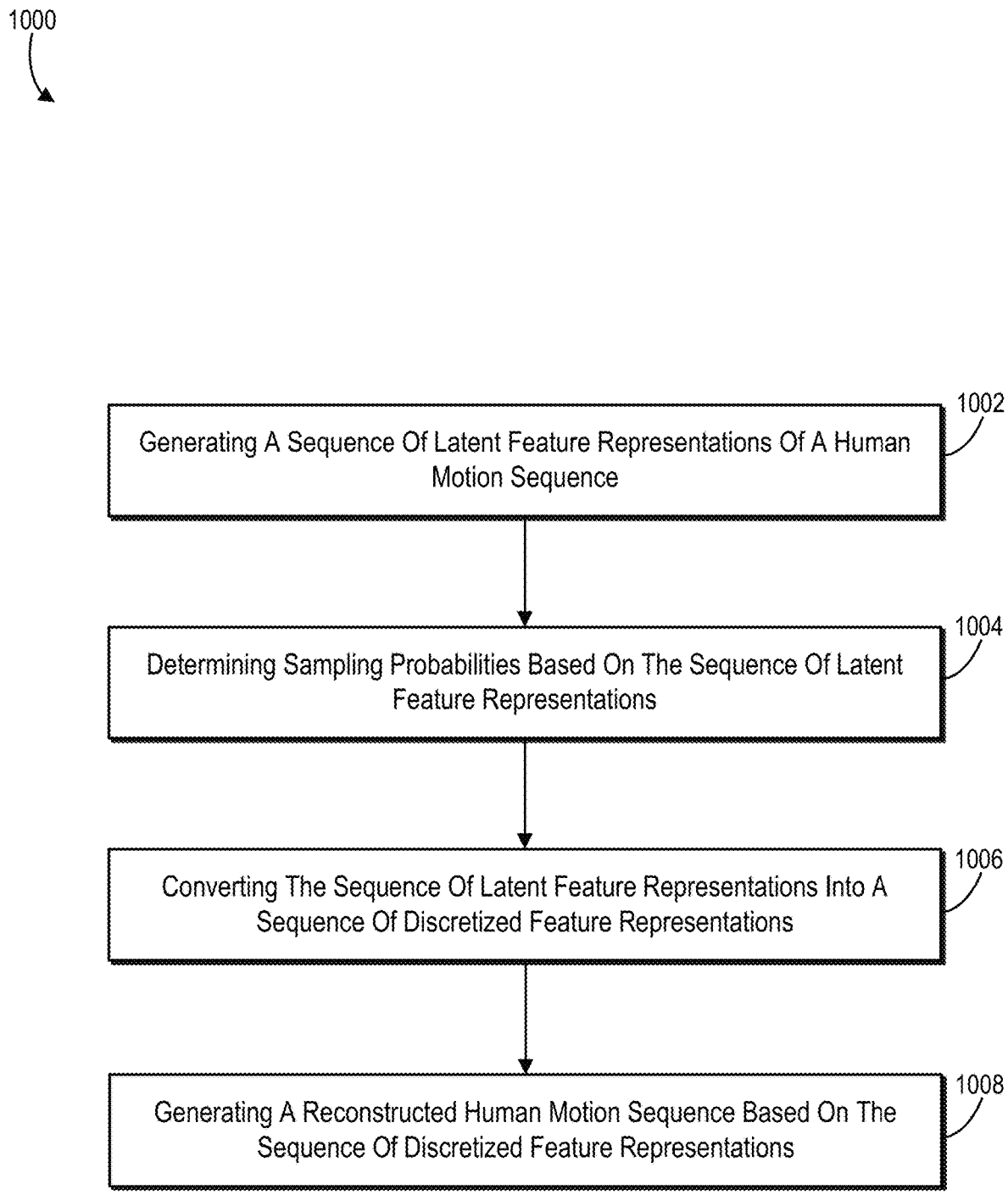
FIG. 10 illustrates a flowchart of a series of acts for reconstructing human motion sequences utilizing motion discretization via a codebook in accordance with one or more implementations.

Turning now to FIG. 10, this figure shows a flowchart of a series of acts 1000 of reconstructing human motion sequences utilizing motion discretization via a codebook. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As shown, the series of acts 1000 includes an act 1002 of generating a sequence of latent feature representations of a human motion sequence. For example, act 1002 involves generating, utilizing an encoder of a discretized motion model, a sequence of latent feature representations of a human motion sequence from an unlabeled digital scene.

Act 1002 can involve generating, utilizing a plurality of convolutional neural network layers of the encoder, the sequence of latent feature representations in a continuous latent space. Act 1002 can involve generating, utilizing a plurality of transformer neural network layers of the encoder, the sequence of latent feature representations in a continuous latent space.

The series of acts 1000 also includes an act 1004 of determining sampling probabilities based on the sequence of latent feature representations. For example, act 1004 involves determining, utilizing a distribution discretization layer of the discretized model, a plurality of sampling probabilities corresponding to a codebook of the discretized model based on the sequence of latent feature representations.

Act 1004 can involve converting, utilizing a softmax layer, a latent feature representation of the sequence of latent feature representations into a set of sampling probabilities corresponding to entries within the codebook of the discretized motion model. For example, act 1004 can involve determining the set of sampling probabilities utilizing a Gumbel-softmax layer. Act 1004 can also involve converting, utilizing the softmax layer, an additional latent feature representation of the sequence of latent feature representations into an additional set of sampling probabilities corresponding to the codebook of the discretized motion model.

Additionally, the series of acts 1000 includes an act 1006 of converting the sequence of latent feature representations into a sequence of discretized feature representations. For example, act 1006 involves converting, utilizing the codebook of the discretized motion model, the sequence of latent feature representations into a sequence of discretized feature representations by mapping the sequence latent feature representations to a plurality of learned latent feature representations corresponding to human motions according to the plurality of sampling probabilities.

Act 1006 can involve sampling a discretized feature representation from the entries within the codebook of the discretized motion model according to the plurality of sampling probabilities. Act 1006 can involve mapping the latent feature representation to a discretized feature representation by sampling the discretized feature representation from a plurality of discretized feature representations according to the set of sampling probabilities. Act 1006 can further involve mapping the additional latent feature representation to an additional discretized feature representation by sampling the additional discretized feature representation from the plurality of discretized feature representations according to the set of sampling probabilities.

Act 1006 can involve determining a dot product between the plurality of sampling probabilities and a matrix of learned latent feature representations in the codebook of the discretized model.

The series of acts 1000 further includes an act 1008 of generating a reconstructed human motion sequence based on the sequence of discretized feature representations. For example, act 1008 involves generating, utilizing a decoder of the discretized motion model, digital content comprising a reconstructed human motion sequence based on the sequence of discretized feature representations.

Act 1008 can involve generating, utilizing the decoder, the reconstructed human motion sequence from the sequence of discretized feature representations according to a plurality of weights corresponding to the sequence of discretized feature representations.

Act 1008 can involve generating a plurality of human models comprising positions and joint angles according to discrete human motions of the reconstructed human motion sequence. Act 1008 can further involve generating a plurality of transition motions for the plurality of human models based on the reconstructed human sequence.

The series of acts 1000 can also include determining a reconstruction loss based on differences between the human motion sequence and the reconstructed human motion sequence. Additionally, the series of acts 1000 can include learning parameters of the encoder and the decoder based on the reconstruction loss. The series of acts 1000 can further include modifying one or more discretized feature representations of a plurality of discretized feature representations of the codebook based on the reconstruction loss.

The series of acts 1000 can also include determining a distribution loss based on a plurality of sampling probabilities determined for the sequence of latent feature representations. For example, the series of acts 1000 can include determining a Kullback-Leibler divergence loss based on a plurality of sampling probabilities determined for the sequence of latent feature representations utilizing a softmax layer associated with the encoder. The series of acts 1000 can also include learning parameters of the discretized motion model based on the Kullback-Leibler divergence loss to modify a distribution of the softmax layer.

The series of acts 1000 can also include learning parameters of the discretized motion model based on combined loss including the reconstruction loss and the distribution loss. For example, the series of acts 1000 can include learning parameters of the encoder, the distribution discretization layer, and the decoder based on a combined loss comprising the reconstruction loss and the Kullback-Leibler divergence loss.

The series of acts 1000 can include generating, utilizing the encoder of the discretized motion model, an additional sequence of latent feature representations of a natural language phrase comprising indications of an additional human motion sequence. The series of acts 1000 can also include converting, utilizing the codebook of the discretized motion model, the additional sequence of latent feature representations into an additional sequence of discretized feature representations from a plurality of learned discretized feature representations based on the reconstructed human motion sequence. Additionally, the series of acts 1000 can include generating, utilizing the decoder of the discretized motion model, three-dimensional digital content comprising an additional reconstructed human motion sequence based on the additional sequence of discretized feature representations.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
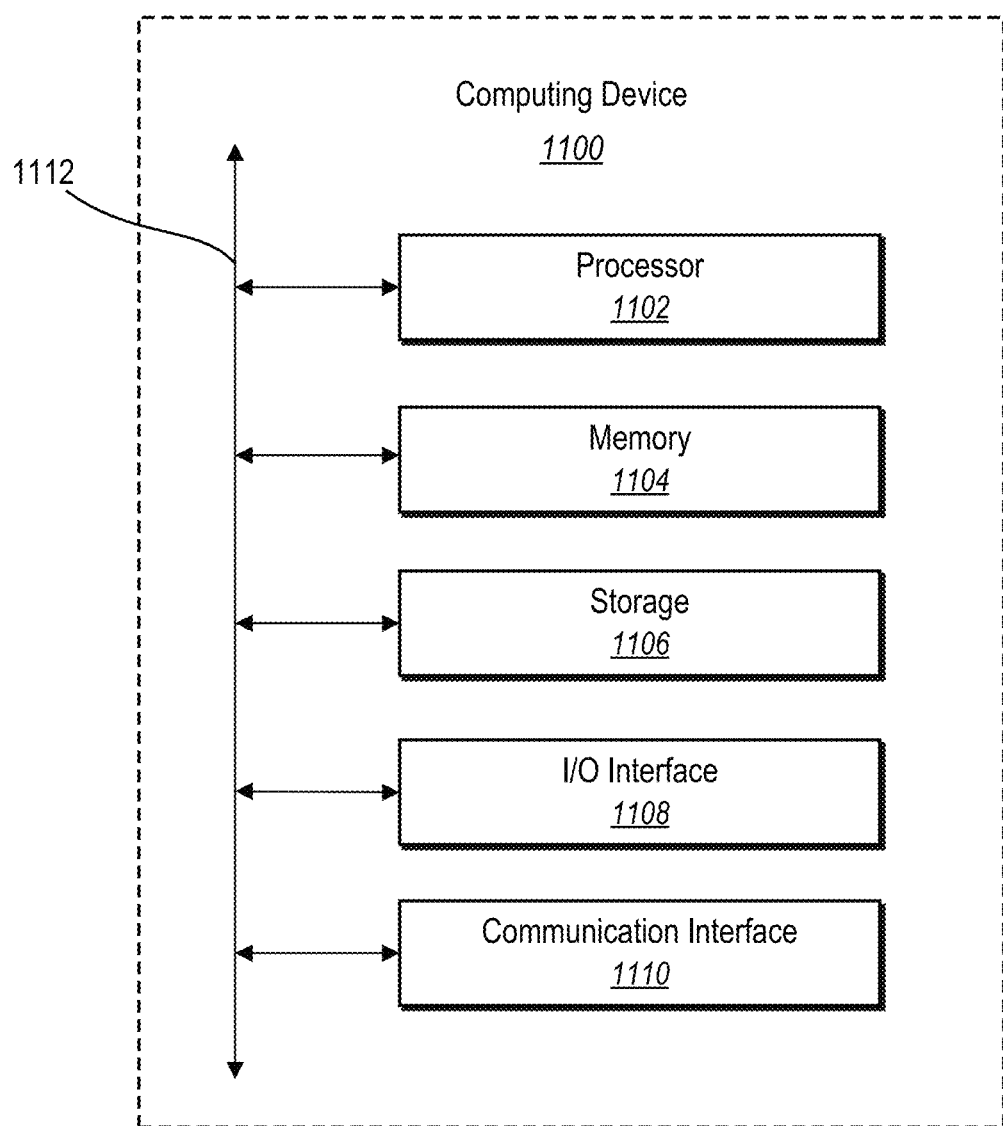
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   generating, utilizing an encoder of a discretized motion model, a sequence of latent feature representations of a human motion sequence from an unlabeled digital scene;
   converting, utilizing a codebook of the discretized motion model, the sequence of latent feature representations into a sequence of discretized feature representations by mapping the sequence of latent feature representations to a plurality of learned latent feature representations corresponding to human motions; and
   generating, utilizing a decoder of the discretized motion model, digital content comprising a reconstructed human motion sequence based on the sequence of discretized feature representations.

2. The computer-implemented method as recited in claim 1, further comprising converting, utilizing a softmax layer, a latent feature representation of the sequence of latent feature representations into a set of sampling probabilities in connection with the codebook of the discretized motion model.

3. The computer-implemented method as recited in claim 2, wherein converting the sequence of latent feature representations into the sequence of discretized feature representations comprises mapping the latent feature representation to a discretized feature representation by sampling the discretized feature representation from a plurality of discretized feature representations according to the set of sampling probabilities.

4. The computer-implemented method as recited in claim 3, wherein converting the sequence of latent feature representations into the sequence of discretized feature representations comprises:
   converting, utilizing the softmax layer, an additional latent feature representation of the sequence of latent feature representations into an additional set of sampling probabilities corresponding to the codebook of the discretized motion model; and
   mapping the additional latent feature representation to an additional discretized feature representation by sampling the additional discretized feature representation from the plurality of discretized feature representations according to the set of sampling probabilities.

5. The computer-implemented method as recited in claim 1, wherein generating the digital content comprises generating, utilizing the decoder, the reconstructed human motion sequence from the sequence of discretized feature representations according to a plurality of weights corresponding to the sequence of discretized feature representations.

6. The computer-implemented method as recited in claim 1, further comprising:
   determining a reconstruction loss based on differences between the human motion sequence and the reconstructed human motion sequence;
   learning parameters of the encoder and the decoder based on the reconstruction loss; and
   modifying one or more discretized feature representations of a plurality of discretized feature representations of the codebook based on the reconstruction loss.

7. The computer-implemented method as recited in claim 1, further comprising:
   determining a Kullback-Leibler divergence loss based on a plurality of sampling probabilities determined for the sequence of latent feature representations utilizing a softmax layer associated with the encoder; and
   learning parameters of the discretized motion model based on the Kullback-Leibler divergence loss to modify a distribution of the softmax layer.

8. The computer-implemented method as recited in claim 1, wherein generating the sequence of latent feature representations comprises generating, utilizing a plurality of convolutional neural network layers of the encoder, the sequence of latent feature representations in a continuous latent space.

9. The computer-implemented method as recited in claim 1, wherein generating the sequence of latent feature representations comprises generating, utilizing a plurality of transformer neural network layers of the encoder, the sequence of latent feature representations in a continuous latent space.

10. The computer-implemented method as recited in claim 1, further comprising:
    generating, utilizing the encoder of the discretized motion model, an additional sequence of latent feature representations of a natural language phrase comprising indications of an additional human motion sequence;
    converting, utilizing the codebook of the discretized motion model, the additional sequence of latent feature representations into an additional sequence of discretized feature representations from a plurality of learned discretized feature representations based on the reconstructed human motion sequence; and
    generating, utilizing the decoder of the discretized motion model, three-dimensional digital content comprising an additional reconstructed human motion sequence based on the additional sequence of discretized feature representations.

11. A system comprising:
one or more computer memory devices; and
one or more servers configured to cause the system to:
generate, utilizing an encoder of a discretized motion model, a sequence of latent feature representations of a human motion sequence from an unlabeled digital scene;
convert, utilizing a codebook of the discretized motion model, the sequence of latent feature representations into a sequence of discretized feature representations by mapping the sequence of latent feature representations to a plurality of learned latent feature representations corresponding to human motions; and
generate, utilizing a decoder of the discretized motion model, digital content comprising a reconstructed human motion sequence based on the sequence of discretized feature representations.

12. The system as recited in claim 11, wherein the one or more servers are further configured to cause the system to:
convert the sequence of latent feature representations into a plurality of sets of sampling probabilities in connection with the codebook of the discretized motion model; and
map the sequence of latent feature representations to discretized feature representation from the codebook by sampling the discretized feature representation according to the plurality of sets of sampling probabilities.

13. The system as recited in claim 11, wherein the one or more servers are further configured to cause the system to convert the sequence of latent feature representations into the sequence of discretized feature representations by:
converting, utilizing a softmax layer, a latent feature representation of the sequence of latent feature representations into a plurality of sampling probabilities corresponding to entries within the codebook of the discretized motion model; and
sampling a discretized feature representation from the entries within the codebook of the discretized motion model according to the plurality of sampling probabilities.

14. The system as recited in claim 11, wherein the one or more servers are further configured to cause the system to generate the digital content by:
generating a plurality of human models comprising positions and joint angles according to discrete human motions of the reconstructed human motion sequence; and
generating a plurality of transition motions for the plurality of human models based on the reconstructed human motion sequence.

15. The system as recited in claim 11, wherein the one or more servers are further configured to cause the system to:
determine a reconstruction loss based on the reconstructed human motion sequence;
determine a distribution loss based on a plurality of sampling probabilities determined for the sequence of latent feature representations; and
learning parameters of the discretized motion model based on the reconstruction loss and the distribution loss.

16. The system as recited in claim 11, wherein the one or more servers are further configured to cause the system to generate the sequence of latent feature representations comprises generating the sequence of latent feature representations from the unlabeled digital scene utilizing a plurality of convolutional neural network layers or a plurality of transformer neural network layers.

17. The system as recited in claim 11, wherein the one or more servers are further configured to cause the system to generate, utilizing the discretized motion model comprising parameters learned based on the reconstructed human motion sequence, an additional reconstructed human motion sequence from a natural language phrase comprising indications of an additional human motion sequence.

18. A non-transitory computer readable storage medium storing instructions that, when executed by at least one processor, cause a computing device to perform operations comprising:
generating, utilizing an encoder of a discretized motion model, a sequence of latent feature representations of a human motion sequence from an unlabeled digital scene;
determining, utilizing a distribution discretization layer of the discretized motion model, a plurality of sampling probabilities corresponding to a codebook of the discretized motion model based on the sequence of latent feature representations;
converting, utilizing the codebook of the discretized motion model, the sequence of latent feature representations into a sequence of discretized feature representations by mapping the sequence of latent feature representations to a plurality of learned latent feature representations corresponding to human motions according to the plurality of sampling probabilities; and
generating, utilizing a decoder of the discretized motion model, digital content comprising a reconstructed human motion sequence based on the sequence of discretized feature representations.

19. The non-transitory computer readable storage medium as recited in claim 18, wherein converting the sequence of latent feature representations into a sequence of discretized feature representations comprises determining a dot product between the plurality of sampling probabilities and a matrix of learned latent feature representations in the codebook of the discretized motion model.

20. The non-transitory computer readable storage medium as recited in claim 18, wherein the instructions, that when executed by at least one processor, further cause the computing device to perform operations comprising:
determining a reconstruction loss based on differences between the human motion sequence and the reconstructed human motion sequence;
determining a Kullback-Leibler divergence loss based on the plurality of sampling probabilities; and
learning parameters of the encoder, the distribution discretization layer, and the decoder based on a combined loss comprising the reconstruction loss and the Kullback-Leibler divergence loss.

* * * * *